United States Patent
Yamada

(10) Patent No.: US 11,126,304 B2
(45) Date of Patent: Sep. 21, 2021

(54) CAPACITANCE SENSOR, METHOD FOR CONTROLLING THE SAME, AND PROGRAM

(71) Applicant: ALPS ALPINE CO., LTD., Tokyo (JP)

(72) Inventor: Tomoki Yamada, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 0 days.

(21) Appl. No.: 17/154,964

(22) Filed: Jan. 21, 2021

(65) Prior Publication Data
US 2021/0141486 A1 May 13, 2021

Related U.S. Application Data

(63) Continuation of application No. PCT/JP2019/010995, filed on Mar. 15, 2019.

(30) Foreign Application Priority Data

Jul. 26, 2018 (JP) .............................. JP2018-140580

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05); *G06F 2203/04108* (2013.01)

(58) Field of Classification Search
CPC .................. G06F 3/0418; G06F 3/0446; G06F 2203/04108
See application file for complete search history.

(56) References Cited

U.S. PATENT DOCUMENTS

| | | | | |
|---|---|---|---|---|
| 8,294,687 | B1 * | 10/2012 | Ksondzyk | G06F 3/0418 345/173 |
| 9,209,802 | B1 * | 12/2015 | Maharyta | G06F 3/0446 |
| 2012/0200524 | A1 * | 8/2012 | Vallis | G01R 35/005 345/174 |
| 2012/0206407 | A1 | 8/2012 | Taylor et al. | |
| 2014/0022203 | A1 * | 1/2014 | Karpin | G06F 3/04166 345/174 |
| 2016/0070388 | A1 | 3/2016 | Yoshikawa et al. | |

FOREIGN PATENT DOCUMENTS

| | | | | |
|---|---|---|---|---|
| JP | 2012118763 A | * | 6/2012 | ........... G06F 3/0446 |
| WO | 2016/035226 | | 3/2016 | |

OTHER PUBLICATIONS

International Search Report from International Application No. PCT/JP2019/010995 dated Jan. 30, 2020.

* cited by examiner

*Primary Examiner* — Michael Pervan

(74) *Attorney, Agent, or Firm* — Beyer Law Group LLP

(57) ABSTRACT

A capacitance sensor includes N electrode groups arranged in a detection area, each of which includes at least one electrode, a capacitance detection unit configured to detect capacitance of capacitors formed between an object and the electrode for individual electrodes, a sum calculation unit configured to add detection values of the capacitance obtained for individual electrodes based on a result of the detection performed by the capacitance detection unit for individual electrode groups so as to calculate sum totals of the detection values for individual N electrode groups, and a determination unit configured to determine whether a detection result of the capacitance detection unit is affected by noise based on the N sum totals calculated for the N electrode groups.

10 Claims, 20 Drawing Sheets

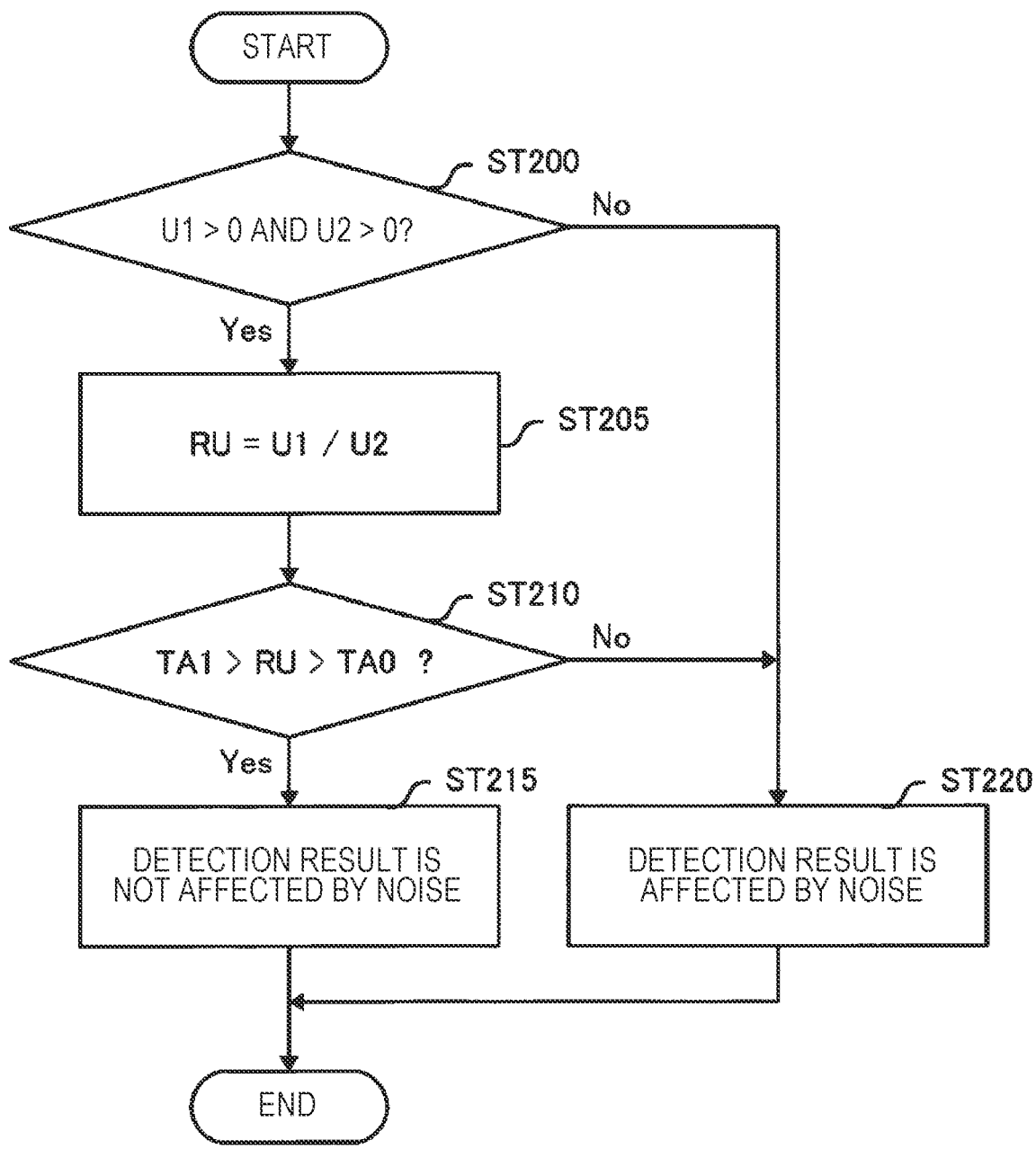

CAPACITANCE SENSOR, METHOD FOR CONTROLLING THE SAME, AND PROGRAM

CLAIM OF PRIORITY

This application is a Continuation of International Application No. PCT/JP2019/010995 filed on Mar. 15, 2019, which claims benefit of Japanese Patent Application No. 2018-140580 filed on Jul. 26, 2018. The entire contents of each application noted above are hereby incorporated by reference.

BACKGROUND OF THE INVENTION

1. Field of the Invention

The present disclosure relates to a capacitance sensor that detects an object, such as a finger or a pen, approaching a detection area as a change in electrostatic capacitance and inputs information, such as a position where the object approaches, a method for controlling the capacitance sensor, and a program. The present disclosure relates to, for example, a capacitance sensor, such as a touch pad or a touch sensor, used for inputting information in an electronic device, such as a computer or a smartphone.

2. Description of the Related Art

Capacitance sensors, such as touch pads and touch panels, that detect a contact position of an object (such as a finger or a pen) based on a change in electrostatic capacitance are widely used as input interfaces for various electronic devices. As a method for detecting capacitance in such a capacitance sensor, a mutual capacitance type and a self-capacitance type are generally used. In the mutual capacitance type detection method, capacitance of a capacitor formed between two electrodes is detected, and in the self-capacitance type detection method, capacitance of a capacitor formed between an object and an electrode which may be regarded as an AC ground potential is detected. In the both detection methods, since minute changes in charge of the capacitor parasitically formed by the electrodes are detected, noise caused by electrostatic coupling between the electrodes and a noise source is likely to be mixed and the noise is easily superimposed on a detection signal.

In the mutual capacitance type touch pad described in U.S. Patent Application Publication No. 2012/0206407 below, detection is performed for all sense electrodes by repeating an operation of selecting and detecting groups of a plurality of sense electrodes in turn. Then, when a plurality of sense electrodes are selected in each detection operation, a number of the sense electrodes selected in the other detection operations are redundantly selected. As a result, each of the sense electrodes is detected a plurality of times, and a plurality of detection values may be obtained. By averaging the plurality of detection values, noise components included in the detection values may be reduced.

However, noise that may be reduced by averaging a plurality of detection values is AC noise that changes with time, and DC noise may not be reduced by the averaging process. Such DC noise may be generated in the following case, for example. That is, when high-frequency external noise is applied to an electrode for detecting capacitance, a high-frequency current flows through an amplifier circuit or the like inside an IC. By this, the DC noise may be generated. When a detection value includes DC noise, a change in the detection value due to actual approach of an object and such noise may not be distinguished from each other, and therefore, a determination as to whether the object has approached may be erroneously made and the erroneous determination is disadvantageous.

SUMMARY OF THE INVENTION

Accordingly, the present disclosure provides a capacitance sensor capable of determining that high-frequency external noise affects a result of detection of capacitance, a method for controlling the capacitance sensor, and a program.

A first aspect of the present disclosure relates to a capacitance sensor that detects approach of an object to a detection area where electrodes are arranged. The capacitance sensor includes N electrode groups arranged in the detection area, N being a natural number not less than 2, each of which includes at least one of the electrodes, a capacitance detection unit configured to detect capacitance of capacitors formed between the object and the electrodes for individual electrodes, a sum calculation unit configured to add detection values of the capacitance obtained for individual electrodes based on a result of the detection performed by the capacitance detection unit for individual electrode groups so as to calculate sum totals of the detection values for individual N electrode groups, and a determination unit configured to determine whether a detection result of the capacitance detection unit is affected by noise based on the N sum totals calculated for the N electrode groups. In an arbitrary area, when a ratio of detection sensitivity of one of the electrode groups to detection sensitivity of the capacitance of the N electrode groups is defined as a sensitivity ratio, the same electrode group has the same sensitivity ratio in each of a plurality of predetermined sections that divide the detection area. The determination unit determines whether the detection result of the capacitance detection unit is affected by noise based on a determination criterion in a normal state set in accordance with each ratio of the N sum totals calculated for the N electrode groups and each ratio of the N sensitivity ratios corresponding to the N electrode groups.

In the capacitance sensor according to the first aspect, N electrode groups, each of which includes at least one electrode E, are arranged in the detection area, and capacitance of a capacitor formed by the object approaching the detection area and the electrode is detected by the capacitance detection unit for each electrode. When detection values of capacitance are obtained for individual electrodes based on a result of the detection performed by the capacitance detection unit, the detection values are added to each other for each electrode group, and accordingly, sum totals of the detection values for the individual N electrode groups are calculated.

Furthermore, in the capacitance sensor according to the first aspect, in the individual sections dividing the detection area, the same electrode group has the same sensitivity ratio (a ratio of detection sensitivity of capacitance of one electrode group to detection sensitivity of capacitance of the N electrode groups). Specifically, one electrode group G has the same sensitivity in all the sections A. The N electrode groups have respective N sensitivity ratios.

Assuming that a size of the object is sufficiently larger than a size of the individual sections, a ratio among capacitance generated between the individual electrode groups and the object in one section A is substantially equal to a ratio among sensitivity ratios of the individual electrode groups in one section A, and further substantially equal to a ratio of sensitivity ratios of the electrode groups in another arbitrary section. Accordingly, in the entire detection area, a ratio among capacitance generated between the electrode groups and the object, that is, a ratio among sum totals calculated for the electrode groups is substantially equal to a ratio of sensitivity ratios among the electrode groups in an arbitrary section, and is substantially a fixed value in the normal state of absence of influence of noise.

Unlike noise mixed in detection values due to electrostatic coupling between a noise source and an electrode, a degree of mixture of the high-frequency external noise in detection values is likely to vary in accordance with a length, a shape, and an extending direction of the electrode. Therefore, a degree of mixture of the high-frequency external noise in the detection values is not uniform among the N electrode groups. When a detection result of the capacitance detection unit is affected by such noise, a ratio among the N sum totals calculated for the N electrode groups is shifted relative to the fixed value in the normal state. Accordingly, in the capacitance sensor according to the first aspect, it is determined whether the detection result of the capacitance detection unit is affected by noise based on a determination criterion in a normal state set in accordance with each ratio of the N sum totals calculated for the N electrode groups and each ratio of the N sensitivity ratios corresponding to the N electrode groups.

Each of the plurality of sections may include N partial electrodes which individually form portions of the different electrodes. The N partial electrodes included in the same section may belong respectively to the different electrode groups. The sensitivity ratio of one of the electrode groups in one of the sections may indicate a ratio of an area occupied by the partial electrode belonging to the one of the electrode groups to an area occupied by the N partial electrodes in the one of the sections.

With this configuration, the sensitivity ratio of one of the electrode groups in one of the sections may indicate a ratio of an area occupied by the partial electrode belonging to the one of the electrode groups to an area occupied by the N partial electrodes in the one of the sections. Therefore, a determination as to whether a detection result of the capacitance detection unit is affected by noise may be easily made with accuracy in accordance with a determination criterion based on a ratio of sensitivity ratios.

The determination unit may perform a calculation of a ratio of two sum totals calculated for an arbitrary pair of the electrode groups on all pairs of the N electrode groups, perform a determination as to whether the ratio calculated for one of the pairs is included in a normal range set for the pair on all the calculated ratios, and perform a determination that a detection result of the capacitance detection unit is affected by noise when at least one of the ratios is out of the normal range. The normal range may be set based on a ratio of the two sensitivity ratios corresponding to the two electrode groups constituting the pair.

With this configuration, ratios of twos of the sum totals of all the pairs of the electrode groups are calculated, and it is determined whether at least one of the ratios calculated for at least one pair is included in the normal range. The normal range in this determination is set for each pair based on a ratio of two sensitivity ratios corresponding to the two electrode groups constituting the pair. When at least one of the ratios is out of the normal range, the ratio of the N sum totals does not satisfy the determination criterion of the normal state set based on the ratio of the N sensitivity ratios, and therefore, the determination unit 24 determines that the detection result of the capacitance detection unit 12 is affected by noise.

The N sensitivity ratios corresponding to the N electrode groups may be equal to one another. The determination unit may calculate a ratio of a minimum value and a maximum value in the N sum totals calculated for the N electrode groups, and determine that a detection result of the capacitance detection unit is affected by noise when the ratio is out of a predetermined normal range that is close to 1.

With this configuration, since the N sensitivity ratios corresponding to the N electrode groups are the same, two of the electrode groups that are arbitrarily selected have the same sensitivity ratio, and a ratio thereof is 1. In the normal state in which a detection result of the capacitance detection unit is not affected by noise, a ratio of two sum totals calculated for the two arbitrarily-selected electrode groups is approximately close to 1. When the ratio of the minimum value and the maximum value in the four sum totals is out of the predetermined normal range close to 1, a ratio of two sum totals of at least one of pairs of electrode groups is out of the normal range, and therefore, it is determined that a detection result of the capacitance detection unit is affected by noise.

The determination unit may calculate, for each of the N electrode groups, an electrode group detection ratio that is a ratio of the sum total calculated for one of the electrode groups to a total value of the N sum totals calculated for the N electrode groups, determine, for all the calculated electrode group detection ratios, whether the electrode group detection ratio calculated for one of the electrode groups is included in a normal range set based on the sensitivity ratio of the one of the electrode groups, and determine that a detection result of the capacitance detection unit is affected by noise when at least one of the electrode group detection ratios is out of the normal range.

With this configuration, an electrode group detection ratios of the N electrode groups are calculated, and it is determined whether each of the N calculated electrode group detection ratios is included in the normal range. It is determined whether the electrode group detection ratio calculated for one of the electrode groups is included in the normal range set based on the sensitivity ratio of the electrode group. The electrode group detection ratio is a ratio of a sum total calculated for one electrode group and sum totals calculated for N electrode groups, and is a value corresponding to a sensitivity ratio of the electrode group. Therefore, in the normal state in which a detection result of the capacitance detection unit is not affected by noise, an electrode group detection ratio is substantially the predetermined value corresponding to the sensitivity ratio and is included in the normal range. When at least one of the electrode group detection ratios is out of the normal range, the at least one of the electrode group detection ratios is shifted from the value corresponding to the sensitivity ratio, and therefore, it is determined that the detection result of the capacitance detection unit is affected by noise.

The N electrode groups may at least include a first electrode group and a second electrode group. The plurality of sections may be arranged in a matrix including the first electrode group and the second electrode group. The first electrode group may include a plurality of partial electrodes constituting the same electrode arranged in a row direction of the matrix arrangement, and the second electrode group may include a plurality of partial electrodes constituting the same electrode arranged in a column direction of the matrix arrangement.

With this configuration, since the arrangement direction of the partial electrodes of the electrodes included in the first electrode group is different from the arrangement directions of the partial electrodes of the electrodes included in the second electrode group, a degree of influence on a detection result by high-frequency external noise is easily different between the first and second electrode groups. Accordingly, a ratio of the sum total of the detection values calculated for the first electrode group to the sum total of the detection values calculated for the second electrode group is easily changed due to influence of high-frequency external noise, and therefore, it may be accurately determined that a detection result of the capacitance detection unit is affected by noise.

The N electrode groups may include at least one third electrode group including a plurality of partial electrodes constituting the same electrode linearly arranged in a direction different from the row direction and the column direction.

With this configuration, since the arrangement direction of the partial electrodes of the third electrode group is different from the arrangement direction of the partial electrodes of the first and second electrode groups, a degree of influence on a detection result by high-frequency external noise is easily different between the third electrode group and the other electrode groups (the first and second electrode groups). Accordingly, a ratio of the sum total of the detection values calculated for the third electrode group to the sum total of the detection values calculated for the other electrode groups (the first and second electrode groups) is easily changed due to influence of high-frequency external noise, and therefore, it may be accurately determined that a detection result of the capacitance detection unit is affected by noise.

The capacitance sensor may include a coordinate calculation unit that determines an approach state of the object in accordance with a determination result of the determination unit and calculates an approach position.

A second aspect of the present disclosure relates to a method for controlling a capacitance sensor that detects approach of an object to a detection area in which electrodes are arranged. The capacitance sensor includes N electrode groups (N is a natural number equal to or larger than 2), each of which includes at least one electrode, and a capacitance detection unit that detects capacitance of a capacitor formed by the object and the electrodes for individual electrodes. Inside an arbitrary area, when a ratio of detection sensitivity of one of the electrode groups to detection sensitivity of the capacitance of the N electrode groups is defined as a sensitivity ratio, the same electrode group has the same sensitivity ratio in each of a plurality of predetermined sections that divide the detection area. The method for controlling a capacitance sensor includes adding detection values of the capacitance obtained for individual electrodes based on a result of the detection performed by the capacitance detection unit for individual electrode groups so as to calculate sum totals of the detection values for individual N electrode groups, and determining whether a detection result of the capacitance detection unit is affected by noise based on a determination criterion in a normal state set in accordance with each ratio of N sum totals calculated for the N electrode groups and each ratio of N sensitivity ratios corresponding to the N electrode groups.

A third aspect of the present disclosure relates to a program that causes a computer to execute the method for controlling a capacitance sensor according to the second aspect.

BRIEF DESCRIPTION OF THE DRAWINGS

FIG. 5 is a flowchart for explaining an example of an operation of determining presence or absence of influence of noise;

DESCRIPTION OF THE PREFERRED EMBODIMENTS

Hereinafter, a capacitance sensor according to an embodiment will be described with reference to the accompanying drawings.

Figure 1:
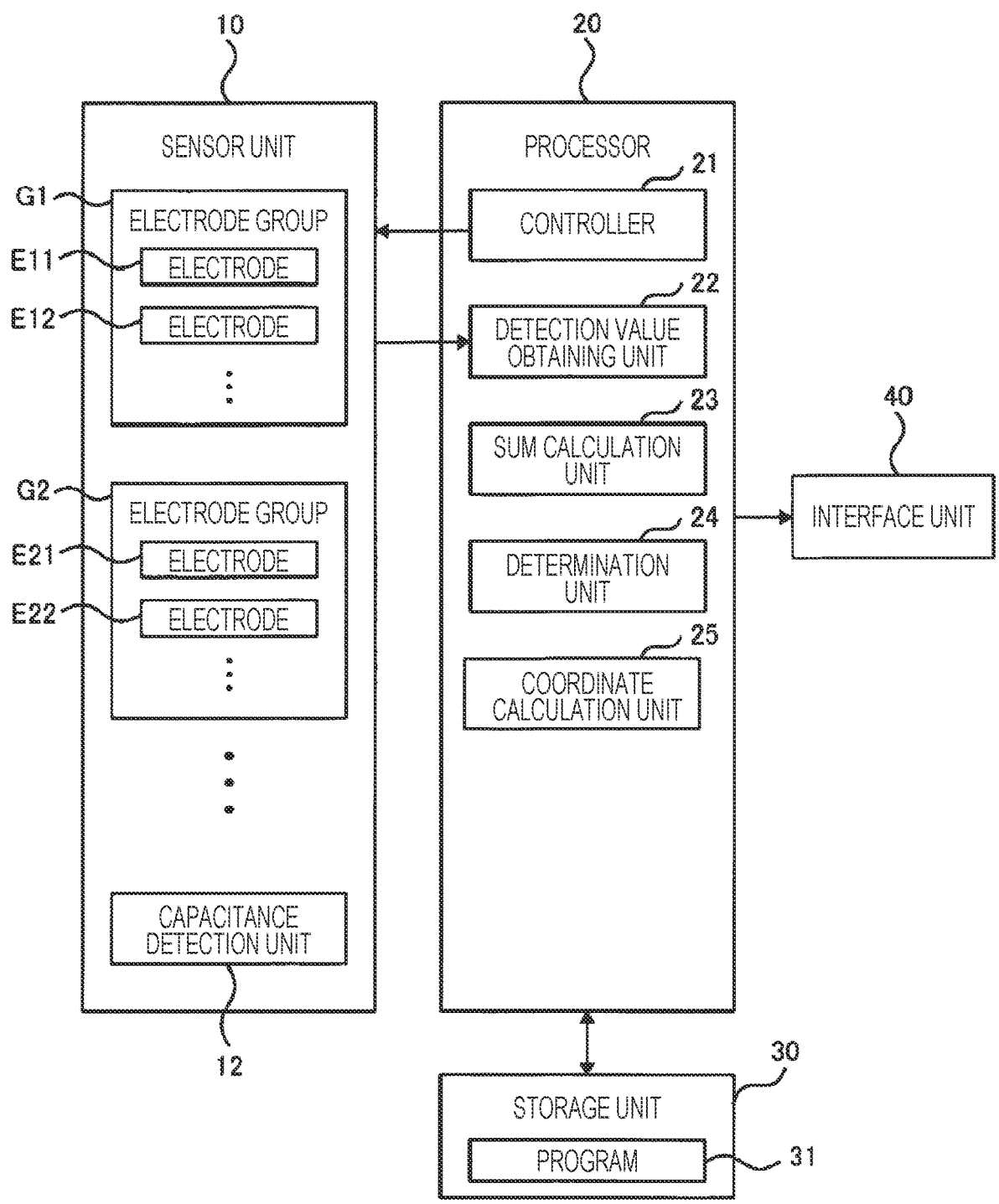
FIG. 1 is a diagram illustrating an example of a configuration of a capacitance sensor according to an embodiment.

FIG. 1 is a diagram illustrating an example of a configuration of the capacitance sensor according to this embodiment. The capacitance sensor illustrated in FIG. 1 includes a sensor unit 10, a processor 20, a storage unit 30, and an interface unit 40. The capacitance sensor according to this embodiment detects approach of an object, such as a finger or a pen, to a detection area AR (illustrated in FIG. 3A described hereinafter) as a change in capacitance and inputs information on a position where the object approaches. The capacitance sensor includes, for example, an input interface, such as a touch pad or a touch panel. Note that "approach" in this specification means that an object is positioned close to a target and presence or absence of contact with the target is not considered.

Sensor Unit 10

The sensor unit 10 detects a degree of approach of an object 1, such as a finger or a pen, as a change in capacitance in a plurality of positions in the detection area AR. As illustrated in FIG. 1, for example, the sensor unit 10 includes a plurality of electrode groups G1, G2, and so on (hereinafter, they may be referred to as "electrode groups G" without distinction). Each of the electrode groups G is arranged in the detection area AR and includes one or more electrodes E. In the example of FIG. 1, electrodes E included in the electrode group G1 are represented by "E11", "E12", and so on, and electrodes E included in the electrode group G2 are represented by "E21", "E22", and so on. The numbers assigned immediately after the reference character "E" indicating the electrodes E represent numbers of the electrode groups G to which the electrodes E belong (numbers assigned to "G").

Furthermore, the sensor unit 10 has a capacitance detection unit 12 that individually detects capacitance of the electrodes E of the plurality of electrode groups G. The capacitance detection unit 12 detects capacitance of a capacitor Cx formed by the object 1 approaching the detection area AR and one of the electrodes E for each electrode E.

Figure 2:
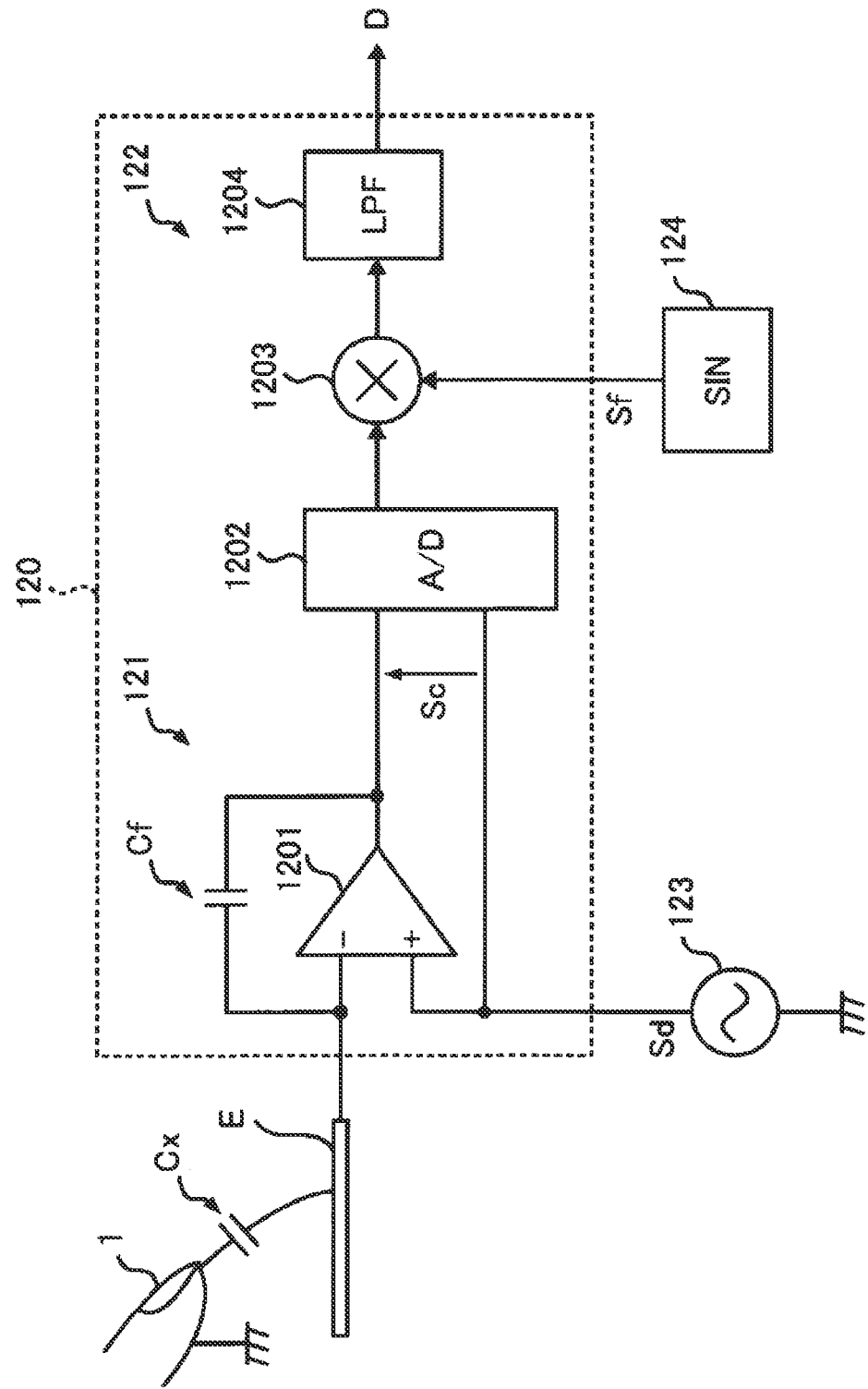
FIG. 2 is a diagram illustrating an example of a configuration of a main portion of a capacitance detection unit in the capacitance sensor illustrated in FIG. 1.

FIG. 2 is a diagram illustrating an example of a configuration of a main portion of the capacitance detection unit 12 in the capacitance sensor illustrated in FIG. 1. The capacitance detection unit 12 includes a plurality of detection units 120 provided corresponding to the plurality of electrodes E, a drive signal generation unit 123 that supplies a drive signal Sd to the plurality of detection units 120, and a reference signal generation unit 124 that supplies a reference signal Sf for demodulation to the plurality of detection units 120. Each of the detection units 120 is connected to a corresponding one of the electrodes E, and generates a detection signal D corresponding to capacitance of a capacitor Cx formed between the electrode E and the object 1. The capacitor Cx is a parasitic capacitance component formed between the object 1, such as a finger, which may be regarded as a conductor of an AC ground potential and an electrode E, and capacitance thereof increases as the object 1 approaches the electrode E.

In the example of FIG. 2, the detection unit 120 has a charge amplifier 121. The charge amplifier 121 generates a detection signal Sc in accordance with the capacitance of the capacitor Cx based on electric charge transmitted to the capacitor Cx through the electrode E. The charge amplifier 121 illustrated in FIG. 2 includes an operational amplifier 1201 and a capacitor Cf. The capacitor Cf is connected between an inverting input terminal and an output terminal of the operational amplifier 1201. An AC drive signal Sd is supplied to a non-inverting input terminal of the operational amplifier 1201 by the drive signal generation unit 123. The electrode E is connected to the inverting input terminal of the operational amplifier 1201. The drive signal Sd is, for example, a sine-wave AC voltage. Since the operational amplifier 1201 controls an output voltage so that a voltage of the inverting input terminal and a voltage of the non-inverting input terminal substantially match each other, an AC voltage substantially the same as the drive signal Sd is generated in the capacitor Cx. When an AC voltage is generated in the capacitor Cx, a change in electric charge occurs in proportion to the AC voltage and the capacitance of the capacitor Cx. The change in electric charge of the capacitor Cx is approximately equal to a change in electric charge of the capacitor Cf. As a result, an AC voltage generated in the capacitor Cf has an amplitude substantially proportional to the capacitance of the capacitor Cx. The detection signal Sc is a voltage generated between the output terminal of the operational amplifier 1201 and the non-inverting input terminal, and has an amplitude substantially equal to the AC voltage generated in the capacitor Cf. Therefore, the detection signal Sc has an amplitude substantially proportional to the capacitance of the capacitor Cx.

In the example of FIG. 2, the detection unit 120 further includes a demodulation unit 122. The demodulation unit 122 demodulates the detection signal Sc using a reference signal Sf, and outputs a signal of a result of the demodulation as a detection signal D. As illustrated in FIG. 2, the demodulation unit 122 includes an A/D converter 1202 that converts an analog detection signal Sc into a digital signal, a multiplication unit 1203, and a low-pass filter 1204. The A/D converter 1202 includes, for example, a differential amplifier that amplifies a difference between an output signal of the operational amplifier 1201 and the detection signal Sc and also functions as a low-pass filter that prevents aliasing. The A/D converter 1202 converts an output signal of the differential amplifier (a signal corresponding to the AC voltage of the capacitor CO into a digital signal. The multiplication unit 1203 multiplies the detection signal Sc converted into the digital signal by the A/D converter 211 with the reference signal Sf. The reference signal Sf is a sine-wave signal having the same frequency as the drive signal Sd and having substantially the same phase as the detection signal Sc generated in accordance with the drive signal Sd. The low-pass filter 1204 removes a high frequency component included in a signal of a result of the multiplication performed by the multiplication unit 1203 and extracts a DC component. The DC component extracted by the low-pass filter 1204 has a magnitude corresponding to the amplitude of the detection signal Sc, and is substantially proportional to the capacitance of the capacitor Cx. The low-pass filter 1204 outputs the DC component as a detection signal D to the processor 20.

Figure 3A:
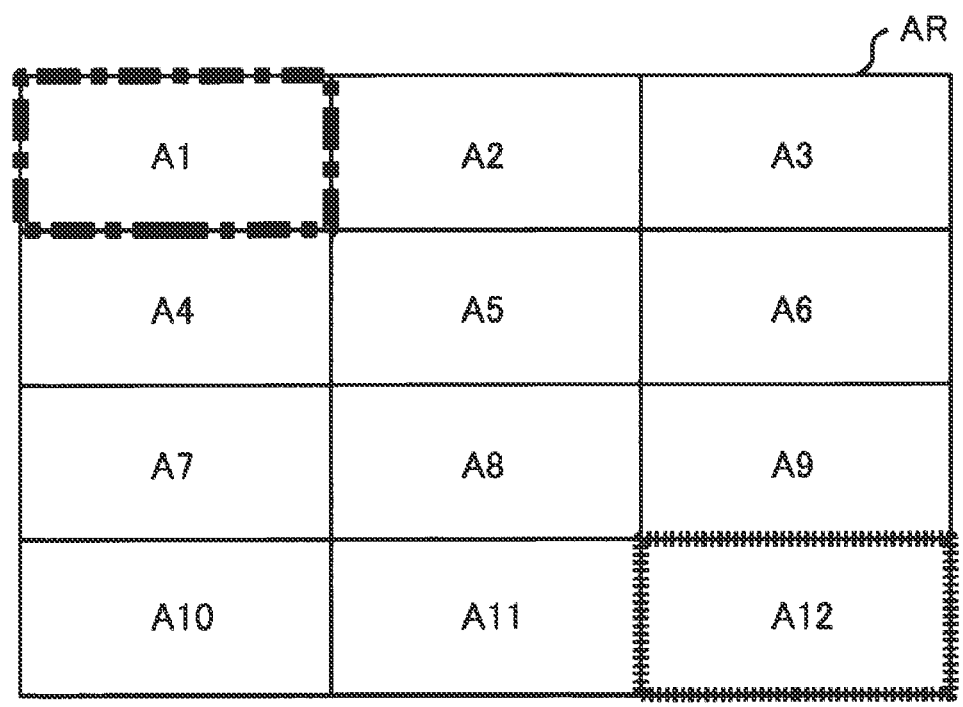
FIG. 3A is a diagram illustrating an example of a plurality of sections dividing a detection area.
Figure 3B:
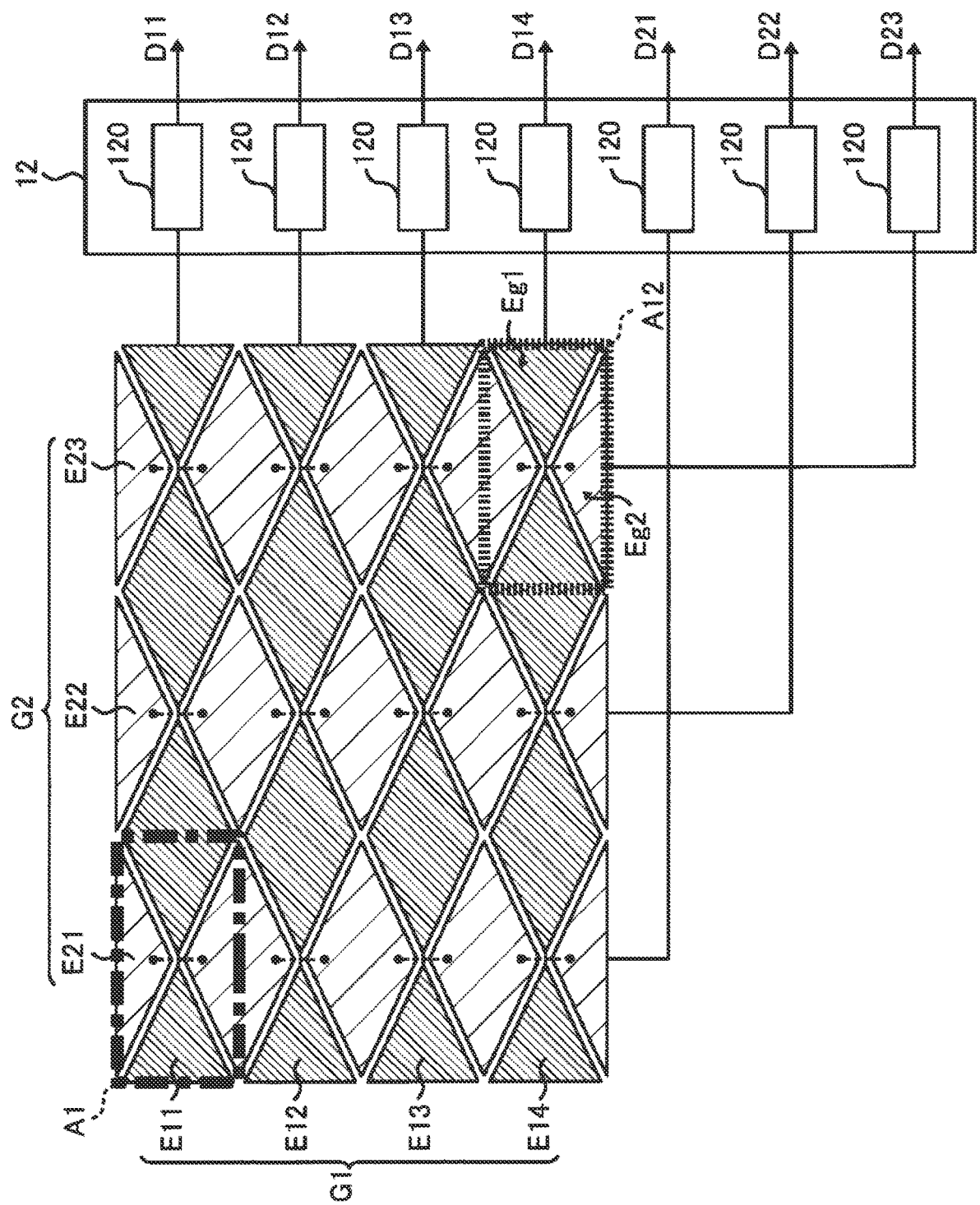
FIG. 3B is a diagram illustrating an example of electrodes arranged in the detection area.

FIGS. 3A and 3B are diagrams illustrating an example of an arrangement pattern of the electrodes E in the sensor unit 10. FIG. 3A is a diagram illustrating an example of a plurality of sections (A1 to A12) that divide the detection area AR, and FIG. 3B is a diagram illustrating an example of a plurality of electrodes (E11 to E14 and E21 to E23) arranged in the detection area AR.

In the example of FIG. 3A, the detection area AR is divided into 12 equal sections A1 to A12 (hereinafter, may be referred to as "sections A" without distinction). The twelve sections A are individually congruent rectangles, and are arranged in a matrix of 4 rows by 3 columns. It is preferable that the sections A are sufficiently smaller than an object to be detected (for example, a fingertip).

Furthermore, in the example of FIG. 3B, the sensor unit 10 has two electrode groups G1 and G2. The electrode group G1 includes the four electrodes E11 to E14, and the electrode group G2 includes the three electrodes E21 to E23. The electrodes E11 to E14 belonging to the electrode group G1 extend in a row direction across three sections A, and are arranged in different rows from each other. The electrodes E21 to E23 belonging to the electrode group G2 extend in a column direction across four sections A, and are arranged in different rows from each other. The seven electrodes (E11 to E14 and E21 to E23) are arranged so that gaps between the electrodes are as small as possible while a state of being insulated from each other is maintained.

The seven electrodes (E11 to E14 and E21 to E23) are individually connected to the detection unit 120 of the capacitance detection unit 12. The detection unit 120 connected to an electrode Eij (where i and j individually indicate natural numbers) outputs a detection signal Dij as a signal corresponding to capacitance of a capacitor formed between the object 1 and the electrode Eij.

Each of the plurality of sections A includes two partial electrodes Eg1 and Eg2 (hereinafter, may be referred to as "partial electrodes Eg" without distinction) that individually form portions of the different electrodes E. The two partial electrodes Eg1 and Eg2 included in the same section A belong respectively to the different electrode groups G. That is, the partial electrode Eg1 belongs to the electrode group G1, and the partial electrode Eg2 belongs to the electrode group G2. In the example of FIG. 3B, a shape of the partial electrode Eg1 is formed such that vertices of two congruent isosceles triangles having parallel sides in a column direction are butted, and is point-symmetric with respect to a center of the section A. Furthermore, a shape of the partial electrode Eg2 is formed such that vertices of two congruent isosceles triangles having parallel sides in a row direction are butted, and is point-symmetric with respect to the center of the section A. The two partial electrodes Eg1 and Eg2 intersect each other at the center of section A. At this intersecting portion, one of the two partial electrodes Eg1 and Eg2 (partial electrode Eg2 in the example of FIG. 3B) makes a detour to a back surface of a substrate or a wiring layer inside the substrate.

Each of the four electrodes E11 to E14 belonging to the electrode group G1 includes three partial electrodes Eg1, and the three partial electrodes Eg1 constituting the same electrode E are arranged in the row direction. Furthermore, each of the three electrodes E21 to E23 belonging to the electrode group G2 includes four partial electrodes Eg2, and the four partial electrodes Eg2 constituting the same electrode E are arranged in the column direction.

Here, a ratio of detection sensitivity of one of the two electrode groups G to detection sensitivity of capacitance of the two electrode groups G inside an arbitrary area is defined as a "sensitivity ratio". Since detection sensitivity of capacitance is substantially proportional to an area of electrodes, detection sensitivity of one of the electrode groups G inside the arbitrary area is substantially proportional to an area of electrodes of the electrode group G inside the area. Therefore, the sensitivity ratio of one of the electrode groups G inside the arbitrary area is substantially equal to a ratio of the area of the electrodes included in the electrode group G to the area of the electrodes of the two electrode groups G (that is, an area of all the electrodes in the area) inside the area.

As illustrated in FIG. 3B, the ratio of the area of the partial electrode Eg1 to the area of the two partial electrodes Eg1 and Eg2 (the area of all the partial electrodes) inside the section A is 0.5 (that is, the area of the partial electrode Eg1 and the area of the partial electrode Eg2 are equal to each other). Therefore, the sensitivity ratio of the electrode group G1 inside the section A (hereinafter referred to as a "sensitivity ratio RS1") is 0.5, and the electrode group G1 has the same sensitivity ratio RS1 (=0.5) in the individual 12 sections A.

Similarly, a sensitivity ratio of the electrode group G2 inside the section A (hereinafter referred to as a "sensitivity ratio RS2") is also 0.5, and the electrode group G2 has the same sensitivity ratio RS2 (=0.5) in the individual 12 sections A.

Processor 20

The processor 20 is a circuit that controls the entire operation of the capacitance sensor, and includes, for example, one or more computers that perform processing in accordance with an instruction code of a program 31 stored in the storage unit 30 and dedicated hardware (such as a logic circuit) configured to realize a specific function. All processes of the processor 20 may be executed based on the program 31 by one or more computers, or at least a number of the processes may be executed by dedicated hardware.

As illustrated in FIG. 1, for example, the processor 20 includes a controller 21, a detection value obtaining unit 22, a sum calculation unit 23, a determination unit 24, and a coordinate calculation unit 25.

The controller 21 appropriately controls a signal generation timing in individual circuits (the detection unit 120, the drive signal generation unit 123, and the reference signal generation unit 124) of the capacitance detection unit 12 so that the detection signal D of each of the electrodes E is generated in a predetermined cycle.

The detection value obtaining unit 22 obtains detection values P of capacitance of the individual electrodes E based on the detection signals D (detection signals D11 to D14 and D21 to D23 in the example of FIG. 3B) generated for individual electrodes E in the capacitance detection unit 12. For example, the detection value obtaining unit 22 determines whether the object 1 approaches the detection area AR based on a temporal change in the detection signal D, and holds the detection signals D of the individual electrodes E obtained when it is determined that the object 1 does not approach the detection area AR as reference values H of the electrodes E. Then, when the capacitance detection unit 12 generates the detection signals D of the electrodes E, the detection value obtaining unit 22 calculates differences between the detection signals D and the reference values H for individual electrode E, and the calculated difference values (D−H) are obtained as the detection values P of the capacitance.

Hereinafter, a reference value H held by the detection value obtaining unit 22 for the electrode Eij is referred to as a "reference value Hij", and a detection value P obtained by the detection value obtaining unit 22 for the electrode Eij is referred to as a "detection value Pij".

The sum calculation unit 23 adds the detection values P of the electrodes E obtained by the detection value obtaining unit 22 to one another for each electrode group G so as to obtain sum totals U of the detection values P of the two electrode groups G. For example, when the detection value obtaining unit 22 obtains detection values P11 to P14 of the electrode group G1 and detection values P21 to P23 of the electrode group G2, the sum calculation unit 23 calculates a sum total "U1" of the detection values P11 to P14 of the electrode group G1 and a sum total "U2" of the detection values P21 to P23 of the electrode group G2.

The determination unit 24 determines whether a detection result of the capacitance detection unit 12 is affected by noise based on the two sum totals U1 and U2 calculated for the two electrode groups G1 and G2. That is, the determination unit 24 determines that a detection result of the capacitance detection unit 12 is affected by noise when a ratio (U1:U2) of the two sum totals U1 and U2 calculated for the two electrode groups G1 and G2 does not satisfy a determination criterion of a predetermined normal state set based on a ratio of the sensitivity ratio RS1 to the sensitivity ratio RS2 (RS1:RS2) corresponding to two electrode groups G1 and G2.

It is assumed that a size of the object 1 approaching the detection area AR is sufficiently larger than a size of the sections A. In this case, assuming that, inside one section A, capacitance of a capacitor formed between the partial electrode Eg1 and the object 1 is indicated by "Cp1", and capacitance of a capacitor formed between the partial electrode Eg2 and the object 1 is indicated by "Cp2", a ratio of the capacitance Cp1 to the capacitance Cp2 (Cp1:Cp2) is substantially close to a ratio of the sensitivity ratio RS1 of the electrode group G1 to the sensitivity ratio RS2 of the electrode group G2 (RS1:RS2) in the section A. Furthermore, assuming that, in the entire detection area AR, capacitance of a capacitor formed between the electrode group G1 and the object 1 is indicated by "Cg1", and capacitance of a capacitor formed between the electrode group G2 and the object 1 is indicated by "Cg2", a ratio of the capacitance Cg1 to the capacitance Cg2 (Cg1:Cg2) is also substantially close to a ratio of the sensitivity ratio RS1 of the electrode group G1 and the sensitivity ratio RS2 of the electrode group G2 in one section A. Here, the sum total U1 of the detection values P calculated for the electrode group G1 corresponds to the capacitance Cg1, and the sum total U2 of the detection values P calculated for the electrode group G2 corresponds to the capacitance Cg2. Therefore, in a normal state in which noise is not mixed in the detection values P, a ratio of the sum total U1 to the sum total U2 (U1:U2) is substantially close to the ratio of the sensitivity ratio RS1 to the sensitivity ratio RS2 (RS1:RS2). Accordingly, when the presence or absence of influence of noise is to be determined based on the ratio of the sum total U1 to the sum total U2 (U1:U2) in the normal state, the ratio of the sensitivity ratio RS1 to the sensitivity ratio RS2 (RS1:RS2) may be used as a determination criterion.

When the sensor unit 10 has the electrode groups G1 and G2 as illustrated in FIGS. 3A to 3B, the ratio of the sensitivity ratio RS1 to the sensitivity ratio RS2 is represented as follows: "RS1:RS2=1:1". Therefore, the ratio RU (=U1/U2) obtained by dividing the sum total U1 by the sum total U2 is approximately close to "1" in the normal state in which noise is not mixed in the detection values P. The determination unit 24 sets a predetermined range in which the ratio RU (=U1/U2) is close to 1 (for example, a range of "0.5" to "1.5") as a normal range, and determines that a detection result of the capacitance detection unit 12 is affected by noise when the ratio RU is out of the normal range.

The coordinate calculation unit 25 determines whether the object 1 approaches the detection area AR based on the detection values P of the electrodes E obtained by the detection value obtaining unit 22 and calculates a coordinate of an approach position when the object 1 approaches the detection area AR. For example, in the example of FIGS. 3A and 3B, the coordinate calculation unit 25 calculates a coordinate of an approach position of the object 1 in the row direction based on distribution of the detection values P21 to P23 of the three electrodes E21 to E23 arranged in the row direction and calculates a coordinate of the approach position of the object 1 in the column direction based on distribution of the detection values P11 to P14 of the four electrodes E11 to E14 arranged in the column direction.

Storage Unit 30

The storage unit 30 stores constant data to be used for processing performed by the processor 20 and variable data temporarily referred to in the course of the processing.

Furthermore, the storage unit 30 stores the program 31 to be executed by the computer of the processor 20. The storage unit 30 includes, for example, at least one of a volatile memory, such as a DRAM or an SRAM, a non-volatile memory, such as a flash memory, and a magnetic storage device, such as a hard disk drive.

Interface Unit 40

The interface unit 40 is a circuit for exchanging data between the capacitance sensor and another control device (such as a control IC of an electronic device equipped with the capacitance sensor). The processor 20 outputs information (information on a coordinate of the object 1 and the like) stored in the storage unit 30 from the interface unit 40 to a control device (not illustrated). Furthermore, the interface unit 40 may obtain the program 31 to be executed by the computer of the processor 20 from a non-temporary recording medium, such as an optical disk or a USB memory, a server on a network, or the like and load the program 31 into the storage unit 30.

Here, an example of an operation of the capacitance sensor having the above-described configuration will be described with reference to the flowcharts illustrated in FIGS. 4 and 5.

Figure 4:
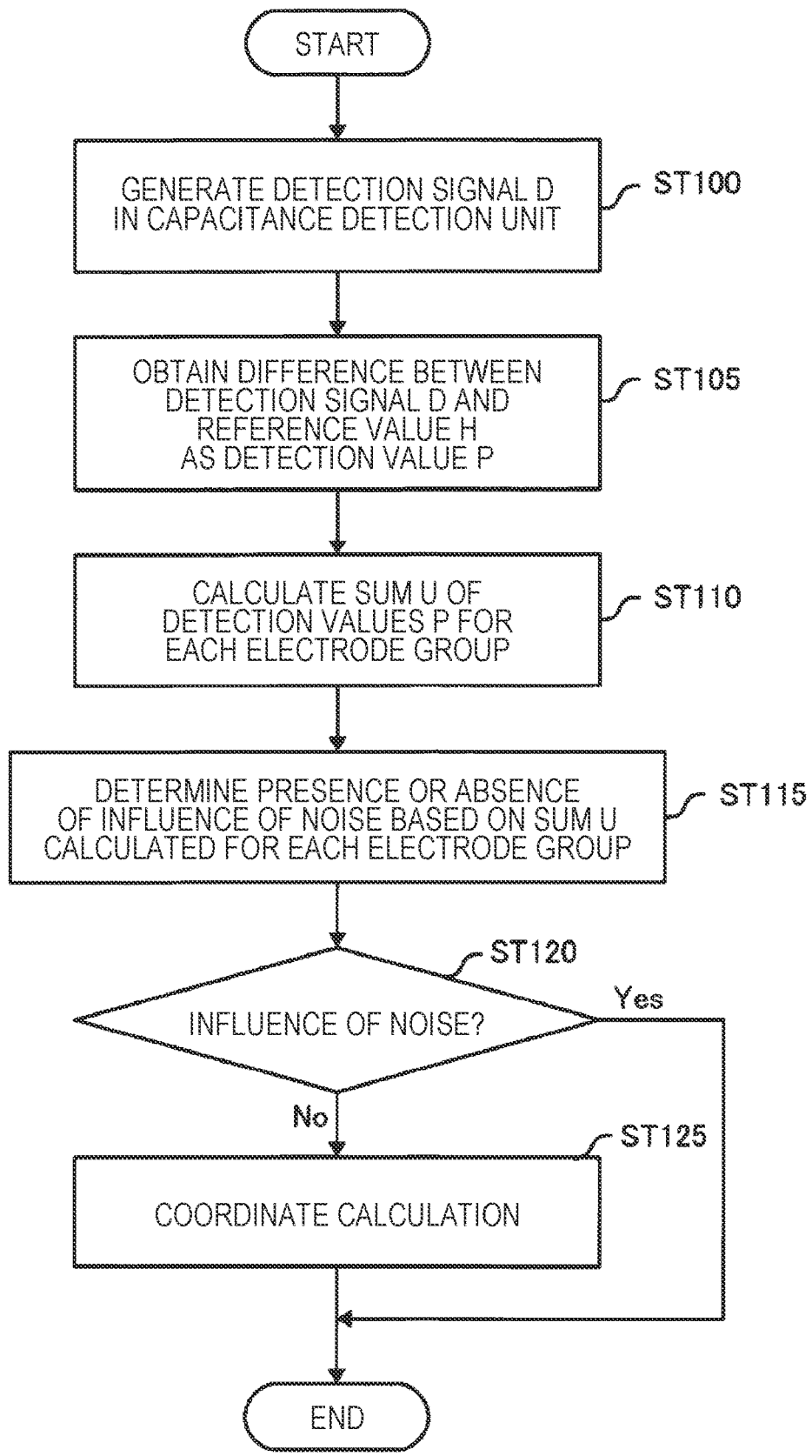
FIG. 4 is a flowchart for explaining an example of an operation of the capacitance sensor according to this embodiment.

FIG. 4 is a flowchart for explaining an example of an operation of the capacitance sensor. The capacitance sensor periodically repeats the operation illustrated in the flowchart of FIG. 4. First, the controller 21 controls the various circuits (the detection unit 120, the drive signal generation unit 123, and the reference signal generation unit 124) of the capacitance detection unit 12 so that the capacitance detection unit 12 generates detection signals D of the individual electrodes E (ST100). When receiving the detection signals D of the electrodes E from the capacitance detection unit 12, the detection value obtaining unit 22 obtains detection values P which are differences between the detection signals D and reference values H, for individual electrodes E (ST105). The sum calculation unit 23 adds the detection values P of the electrodes E obtained by the detection value obtaining unit 22 to one another for each electrode group G so as to obtain sum totals U of the detection values P of the two electrode groups G (ST110).

The determination unit 24 determines whether a detection result of the capacitance detection unit 12 is affected by noise based on the sum totals U of the detection values P calculated for the individual two electrode groups G (ST115). When the determination unit 24 determines that a detection result of the capacitance detection unit 12 is not affected by noise (No in ST120), the coordinate calculation unit 25 determines whether the object 1 approaches the detection area AR based on the detection values P of the electrodes E obtained by the detection value obtaining unit 22, and calculates a coordinate of an approach position when the object 1 approaches the detection area AR (ST125). When the determination unit 24 determines that a detection result of the capacitance detection unit 12 is affected by noise (Yes in ST120), the coordinate calculation unit 25 does not perform a determination of an approach state of the object 1 in the detection area AR or a calculation of an approach position.

FIG. 5 is a flowchart for explaining an example of an operation of determining presence or absence of influence of noise performed by the determination unit 24 (step ST115 in FIG. 4). First, the determination unit 24 determines whether or not the two sum totals U1 and U2 calculated for the two electrode groups G1 and G2 are individually larger than zero (ST200). When at least one of the two sum totals U1 and U2 is zero or less (No in ST200), the determination unit 24 determines that a detection result of the capacitance detection unit 12 is affected by noise (ST220). Since the reference values H are set to values smaller than the detection signals D, the detection values P are usually positive values, and the sum totals U of the sums of the detection values P are also positive values. Therefore, when the sum total U is zero or less, the determination unit 24 determines that the normal state is not achieved.

When the two sum totals U1 and U2 are both larger than zero (Yes in ST200), the determination unit 24 calculates the ratio RU (=U1/U2) of the two sum totals U1 and U2 (ST205). At this time, since the sum totals U1 and U2 are both larger than zero, no calculation error occurs due to a divisor becoming zero. When the ratio RU is included in a predetermined normal range (a range larger than a threshold value TA0 and smaller than a threshold value TA1) (Yes in ST210), the determination unit 24 determines that a detection result of the capacitance detection unit 12 is not affected by noise (ST215). On the other hand, when the ratio RU is out of the predetermined normal range (No in ST210), the determination unit 24 determines that a detection result of the capacitance detection unit 12 is affected by noise (ST220).

Figure 6A:
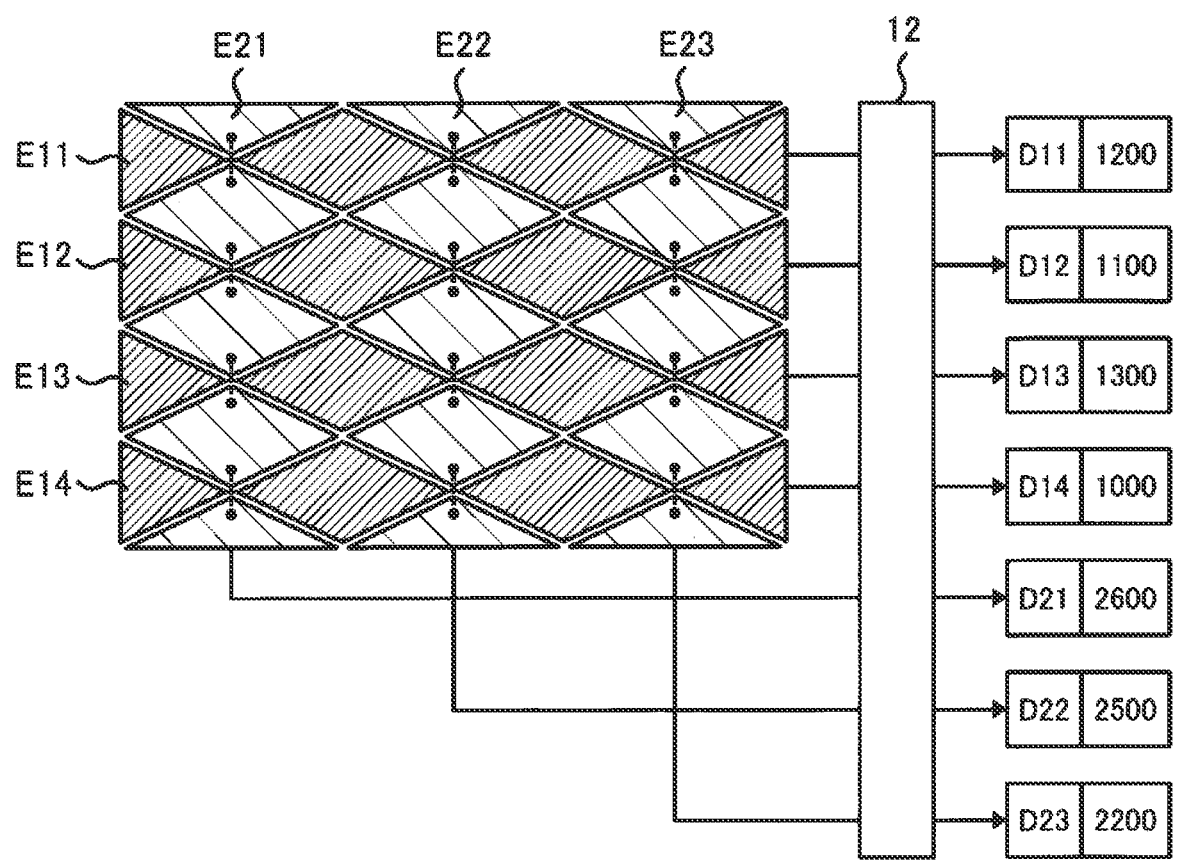
FIG. 6A is a diagram illustrating an example of a detection signal in a state in which an object does not approach the detection area.
Figure 6B:
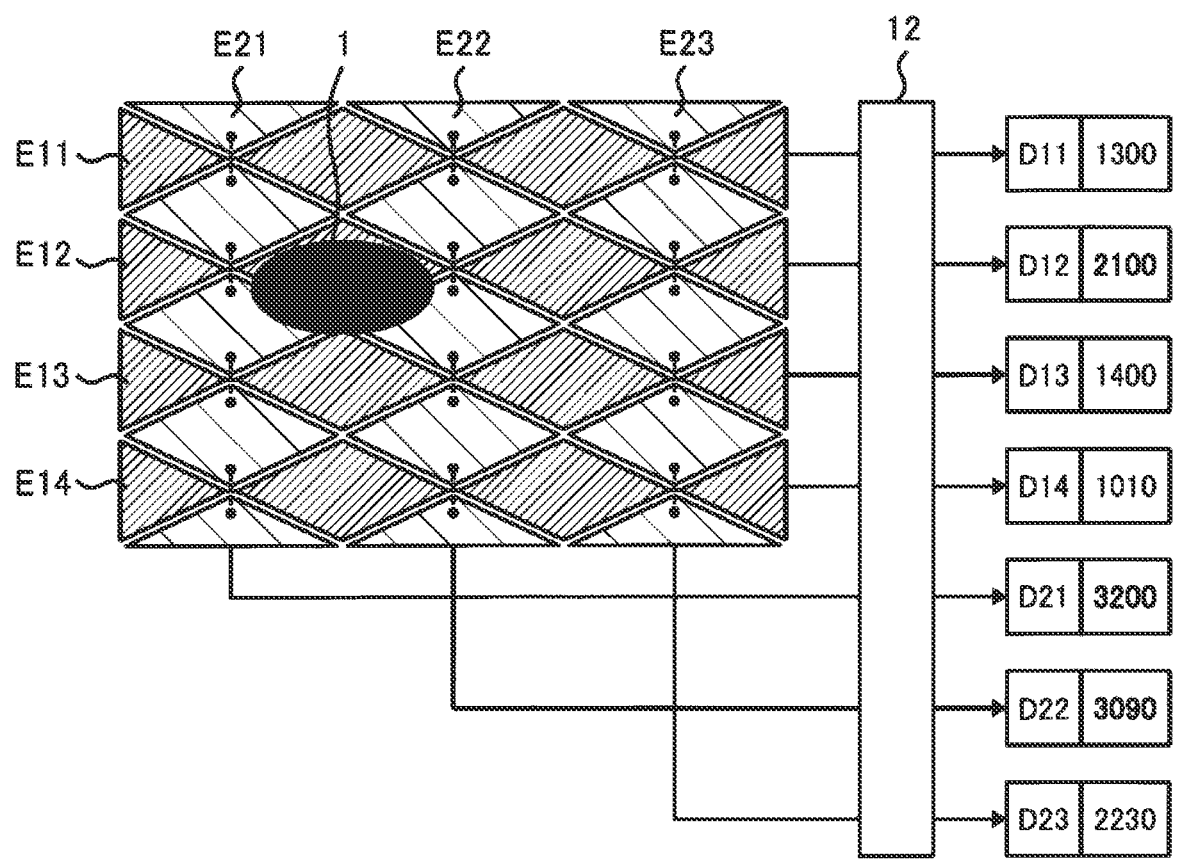
FIG. 6B is a diagram illustrating an example of a detection signal in a state in which an object approaches the detection area.

FIGS. 6A and 6B are diagrams illustrating examples of the detection signals D11 to D14 and D21 to D23. FIG. 6A is a diagram illustrating an example of the detection signals D11 to D14 and D21 to D23 when the object 1 does not approach the detection area AR, and FIG. 6B is a diagram illustrating the detection signals D11 to D14 and D21 to D23 when the object 1 approaches the detection area AR. Values of the detection signals D11 to D14 and D21 to D23 in the state in which the objects 1 approaches are relatively larger than those in the state in which the objects 1 does not approach. In the example of FIG. 6B, since the object 1 approaches the electrodes E12, E21, and E22, values of the detection signals D12, D21, and D22 corresponding to the electrodes E12, E21, and E22 are particularly large.

Figure 7:
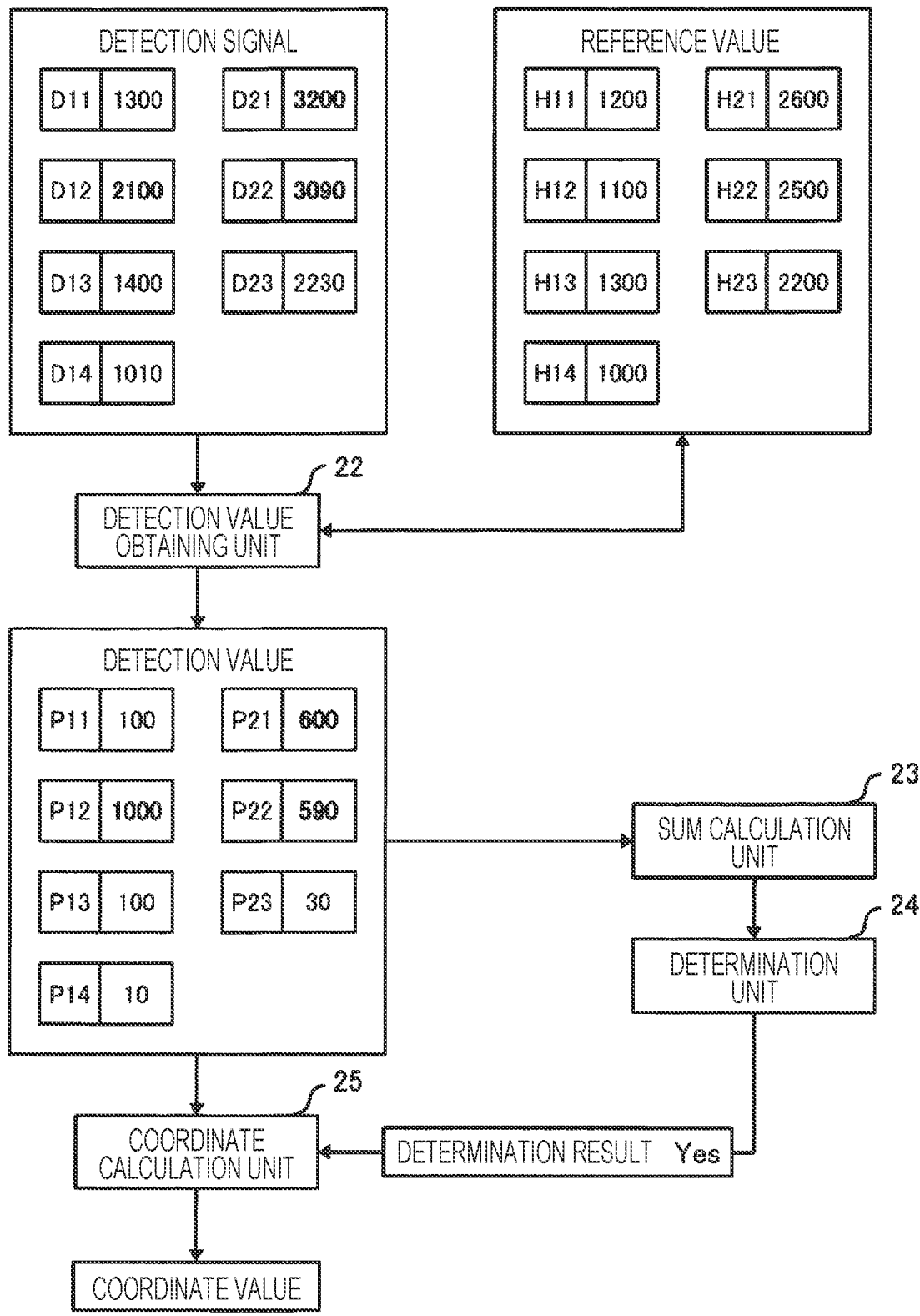
FIG. 7 is a diagram illustrating signal processing performed when the detection signal illustrated in FIG. 6B is generated.

FIG. 7 is a diagram illustrating signal processing performed when the detection signals D11 to D14 and D21 to D23 illustrated in FIG. 6B are generated. In the example of FIG. 7, the detection value obtaining unit 22 holds the detection signals D11 to D14 and D21 to D23 illustrated in FIG. 6A obtained in the state in which the object 1 does not approach as the reference values H11 to H14 and H21 to H23, respectively. The detection value obtaining unit 22 calculates detection values P11 to P14 and P21 to P23 illustrated in FIG. 7 as difference values obtained by subtracting the reference values H11 to H14 and H21 to H23 from the detection signals D11 to D14 and D21 to D23, respectively.

Figure 8:
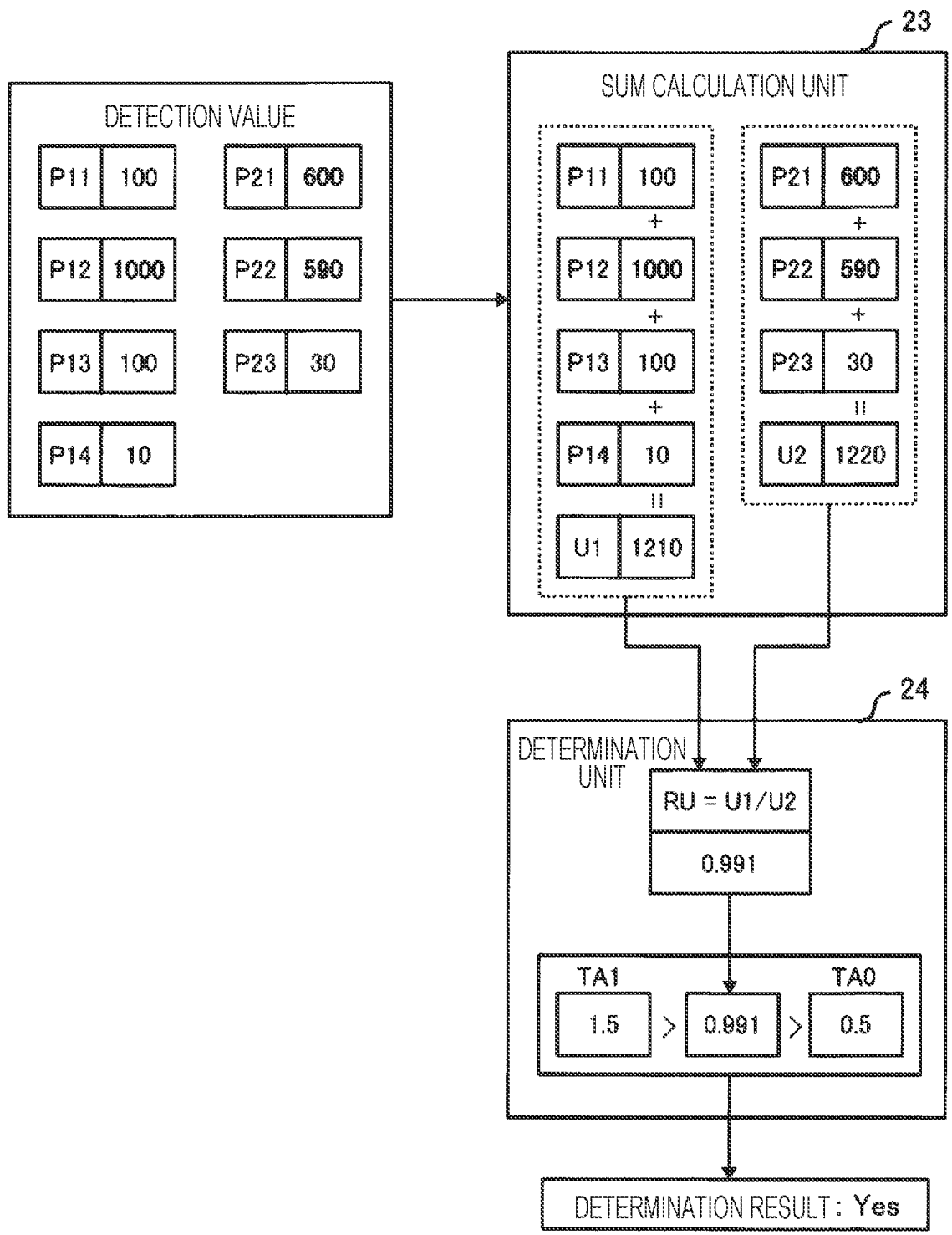
FIG. 8 is a diagram illustrating signal processing performed when a detection value illustrated in FIG. 7 is obtained.

FIG. 8 is a diagram illustrating signal processing when the detection values P11 to P14 and P21 to P23 illustrated in FIG. 7 are obtained. In the example of FIG. 8, the sum calculation unit 23 calculates a sum total U1 by adding the detection values P11 to P14 obtained for the electrode group G1 to each other and a sum total U2 by adding the detection values P21 to P23 obtained for the electrode group G2 to each other. The determination unit 24 calculates a ratio RU of the sum total U1 to the sum total U2, and determines whether the ratio RU is included in a predetermined normal range (a range larger than 0.5 and smaller than 1.5). In this example, the ratio RU is "0.991" and included in the normal range. Therefore, the determination unit 24 determines that a detection result of the capacitance detection unit 12 is not affected by noise. The coordinate calculation unit 25 calculates a coordinate based on the detection values P11 to P14 and P21 to P23 in response to the determination result.

Figure 9:
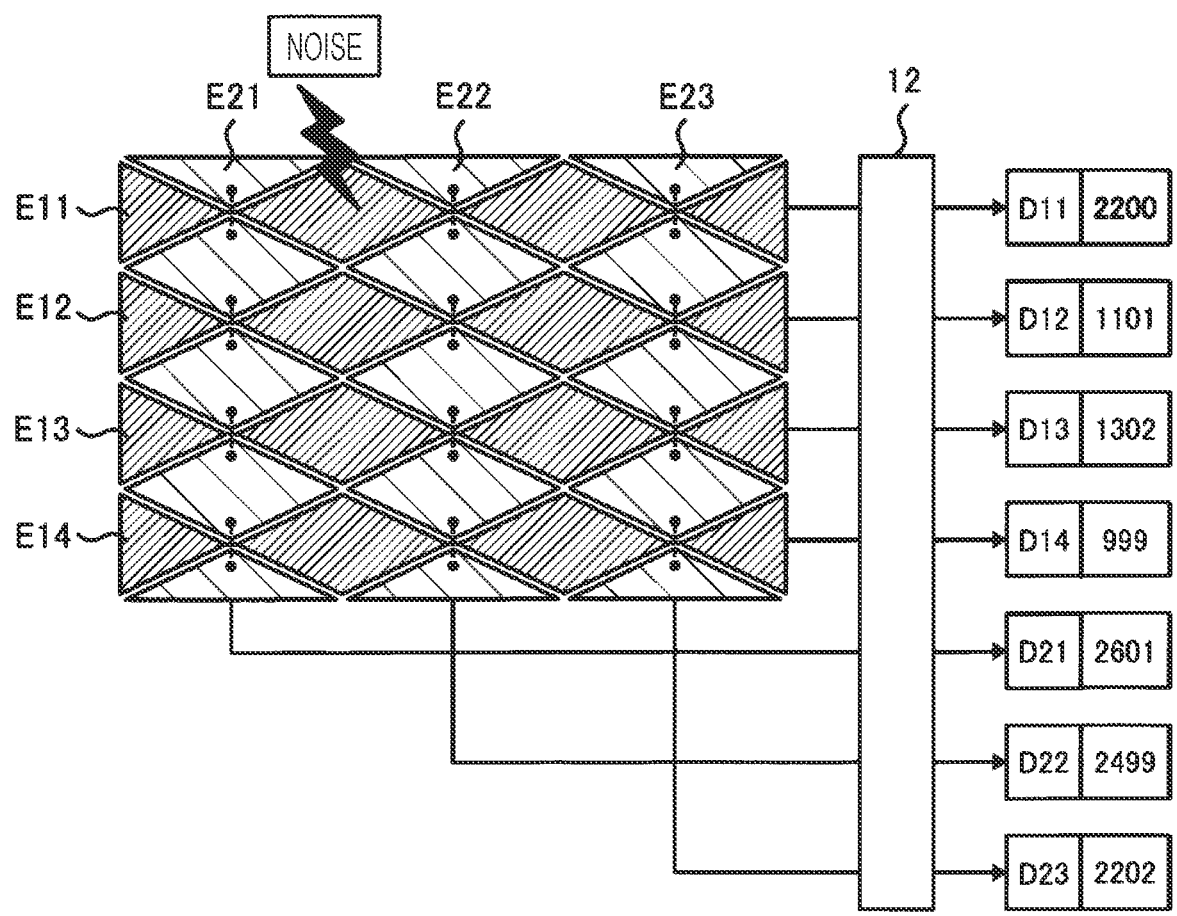
FIG. 9 is a diagram illustrating an example of detection signals obtained when noise is applied to an electrode.

FIG. 9 is a diagram illustrating an example of the detection signals D11 to D14 and D21 to D23 obtained when noise is applied to the electrode E11. In this example, a value of the detection signal D11 corresponding to the electrode E11 is particularly increased when compared with values of the other detection signals D12 to D14 and D21 to D23. For example, when the electrode E11 functions as an antenna for high-frequency external noise and is characterized by easily resonating in a frequency of external noise, the high-frequency external noise is easily transmitted from the electrode E11 to an input of the detection unit 120. When the high-frequency external noise is input to the processor 20, high-frequency current is supplied to an analog circuit (such as the operational amplifier 1201) of the detection unit 120 and a DC noise component is superposed on an analog signal (such as the detection signal Sc). As a result, the DC noise component is added to the value of the detection signal D11. Such a noise component may not be removed by an averaging process.

Figure 10:
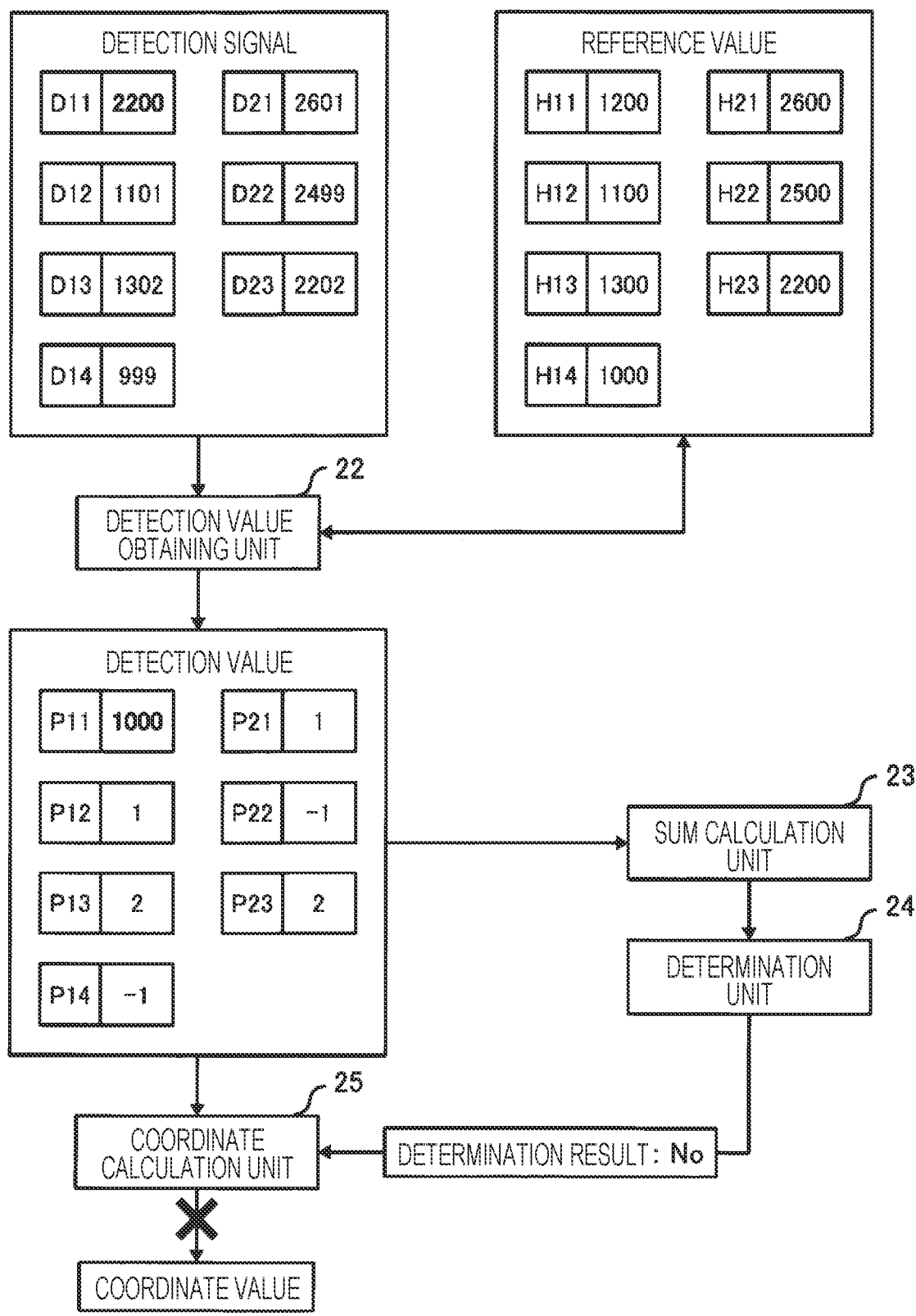
FIG. 10 is a diagram illustrating signal processing performed when the detection signals illustrated in FIG. 9 are generated.

FIG. 10 is a diagram illustrating signal processing performed when the detection signals D11 to D14 and D21 to D23 illustrated in FIG. 9 are generated. Also in the example of FIG. 10, the detection value obtaining unit 22 holds the detection signals D11 to D14 and D21 to D23 illustrated in FIG. 6A as the reference values H11 to H14 and H21 to H23, respectively. The detection value obtaining unit 22 calculates detection values P11 to P14 and P21 to P23 illustrated in FIG. 10 as difference values obtained by subtracting the reference values H11 to H14 and H21 to H23 from the detection signals D11 to D14 and D21 to D23, respectively.

Figure 11:
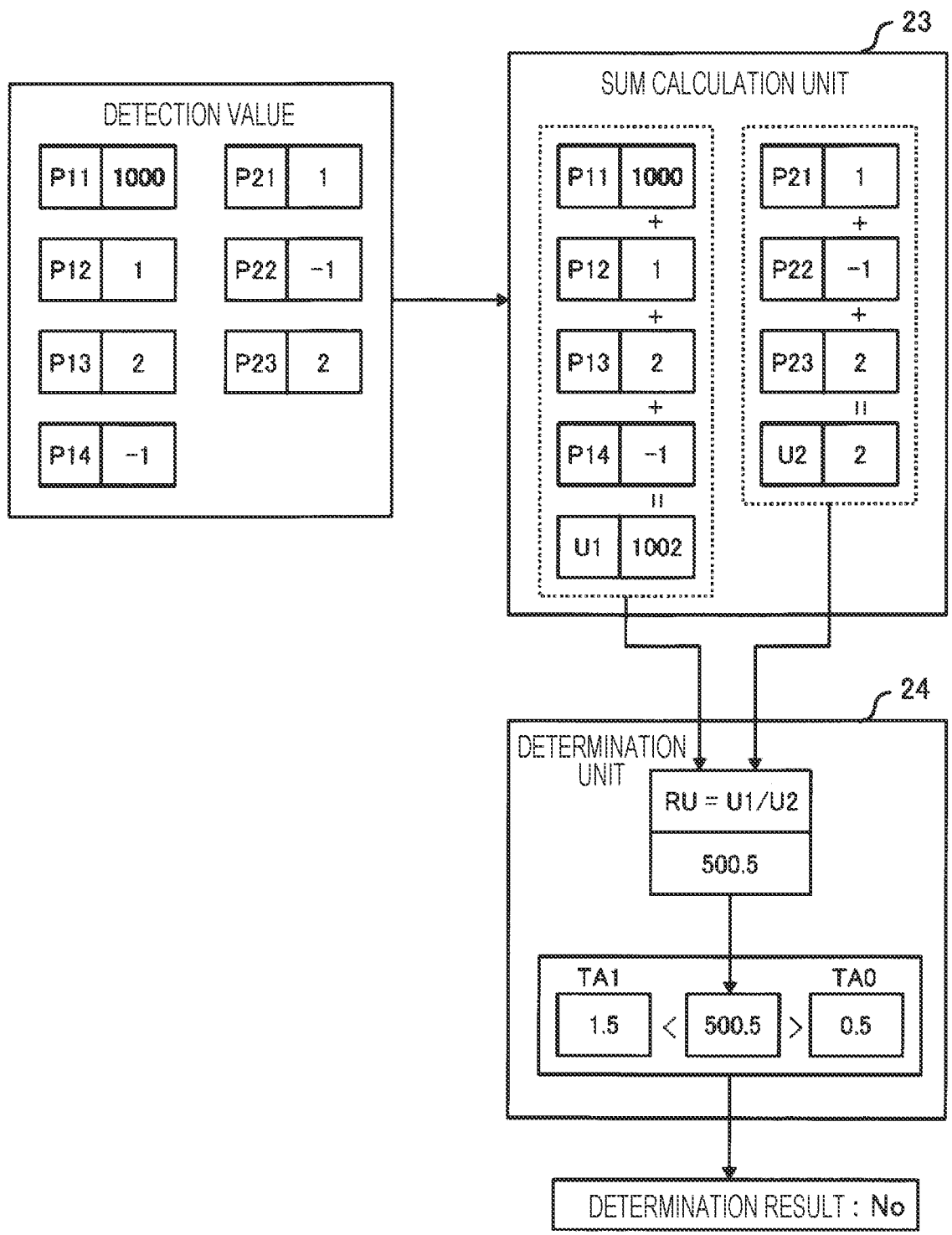
FIG. 11 is a diagram illustrating signal processing performed when detection values illustrated in FIG. 10 are obtained.

FIG. 11 is a diagram illustrating signal processing performed when the detection values P11 to P14 and P21 to P23 illustrated in FIG. 10 are obtained. Also in the example of FIG. 11, the sum calculation unit 23 calculates a sum total U1 by adding the detection values P11 to P14 to each other and a sum total U2 by adding the detection values P21 to P23 to each other. The determination unit 24 calculates a ratio RU of the sum total U1 to the sum total U2, and determines whether the ratio RU is included in a predetermined normal range (a range larger than 0.5 and smaller than 1.5). In this example, the ratio RU is "500.5" and is out of the normal range. Therefore, the determination unit 24 determines that a detection result of the capacitance detection unit 12 is affected by noise. The coordinate calculation unit 25 does not perform the coordinate calculation (FIG. 10) based on the detection values P11 to P14 and P21 to P23.

As described hereinabove, according to this embodiment, N electrode groups G (the two electrode groups G in the example illustrated in FIGS. 3A and 3B), each of which includes at least one electrode E, are arranged in the detection area AR, and capacitance of a capacitor formed by the object 1 approaching the detection area AR and the electrode E is detected by the capacitance detection unit 12 for each electrode E. When detection values P of capacitance are obtained for individual electrodes E based on a result of the detection performed by the capacitance detection unit 12, the detection values P are added to each other for each electrode group G, and accordingly, sum totals U of the detection values P for the individual N electrode groups are calculated.

Furthermore, in this embodiment, in the individual sections A dividing the detection area AR, the same electrode group G has the same sensitivity ratio (a ratio of detection sensitivity of capacitance of one electrode group G to detection sensitivity of capacitance of the N electrode groups G). Specifically, one electrode group G has the same sensitivity in all the sections A. The N electrode groups G have respective N sensitivity ratios.

Assuming that a size of the object 1 is sufficiently larger than a size of the individual sections A, a ratio among capacitance generated between the individual electrode groups G and the object 1 in one section A is substantially equal to a ratio among sensitivity ratios of the individual electrode groups G in one section A, and further substantially equal to a ratio of sensitivity ratios of the electrode groups G in another arbitrary section A. Accordingly, in the entire detection area AR, a ratio among capacitance generated between the electrode groups G and the object 1, that is, a ratio among sum totals U calculated for the electrode groups G are substantially equal to a ratio of sensitivity ratios among the electrode groups G in an arbitrary section A, and is a substantially fixed value in the normal state of absence of influence of noise.

Unlike noise mixed in detection values P due to electrostatic coupling between a noise source and an electrode E, a degree of mixture of the high-frequency external noise in detection values P is likely to vary in accordance with a length, a shape, and an extending direction of the electrode E. Therefore, a degree of mixture of the high-frequency external noise in the detection values P is not uniform among the N electrode groups G. When a detection result of the capacitance detection unit 12 is affected by such noise, a ratio among the N sum totals U calculated for the N electrode groups G is shifted relative to the fixed value in the normal state. Accordingly, in this embodiment, it is determined that a detection result of the capacitance detection unit 12 is affected by noise when a ratio of the N sum totals U calculated for the N electrode groups G does not satisfy the determination criteria of the normal state set based on a ratio among the N sensitivity ratios corresponding to the N electrode groups G. According to this embodiment, it may be appropriately determined that a detection result of the capacitance is affected by the high-frequency external noise.

Furthermore, in this embodiment, each of the plurality of sections A includes N partial electrodes Eg constituting portions of different electrodes E, and the N partial electrodes Eg included in the same section A belong respectively to different electrode groups G. Specifically, each of the plurality of sections A includes the N electrode groups G arranged as the partial electrodes Eg. Then the sensitivity ratio for one electrode group G indicates a ratio of an area occupied by the partial electrode Eg belonging to the one electrode group G to an area occupied by the N partial electrodes Eg in one section A and is a fixed value which merely varies. Therefore, a determination as to whether a detection result of the capacitance detection unit 12 is affected by noise may be accurately determined in accordance with a determination criterion based on a ratio of sensitivity ratios that merely varies.

Furthermore, although the partial electrodes Eg of the electrodes E included in the electrode group G1 are arranged in the row direction, the partial electrodes Eg of the electrodes E included in the electrode group G2 are arranged in the column direction in this embodiment. That is, the arrangement directions thereof are different. Therefore, different degrees of influence of high-frequency external noise on the detection result are obtained for the different electrode groups G1 and G2. Accordingly, a ratio of the sum total U1 of the detection values P calculated for the electrode group G1 to the sum total U2 of the detection values P calculated for the electrode group G2 is easily changed due to influence of high-frequency external noise, and therefore, it may be accurately determined that a detection result of the capacitance detection unit 12 is affected by noise.

Modification

Next, modifications of the capacitance sensor according to this embodiment will be described.

Figure 12A:
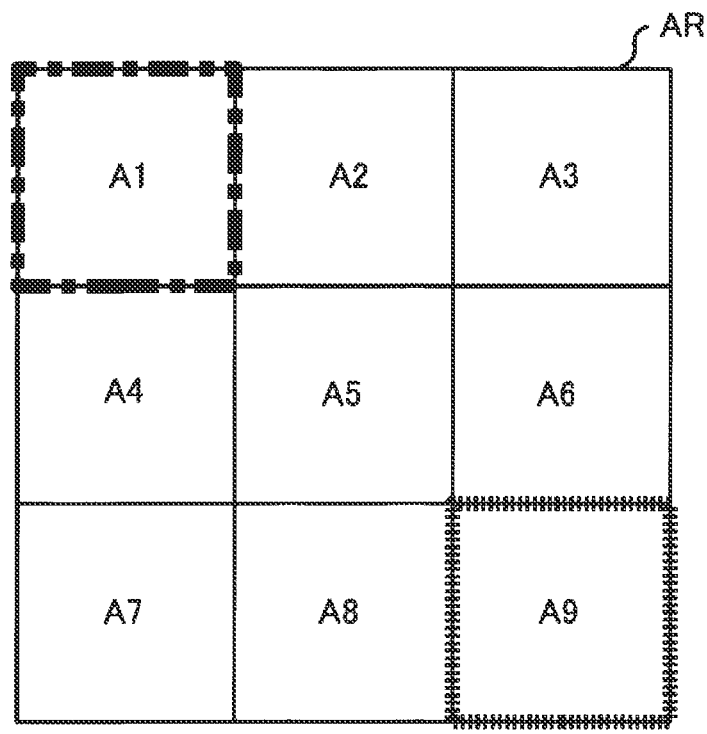
FIG. 12A is a diagram illustrating an example of a plurality of sections dividing a detection area.
Figure 12B:
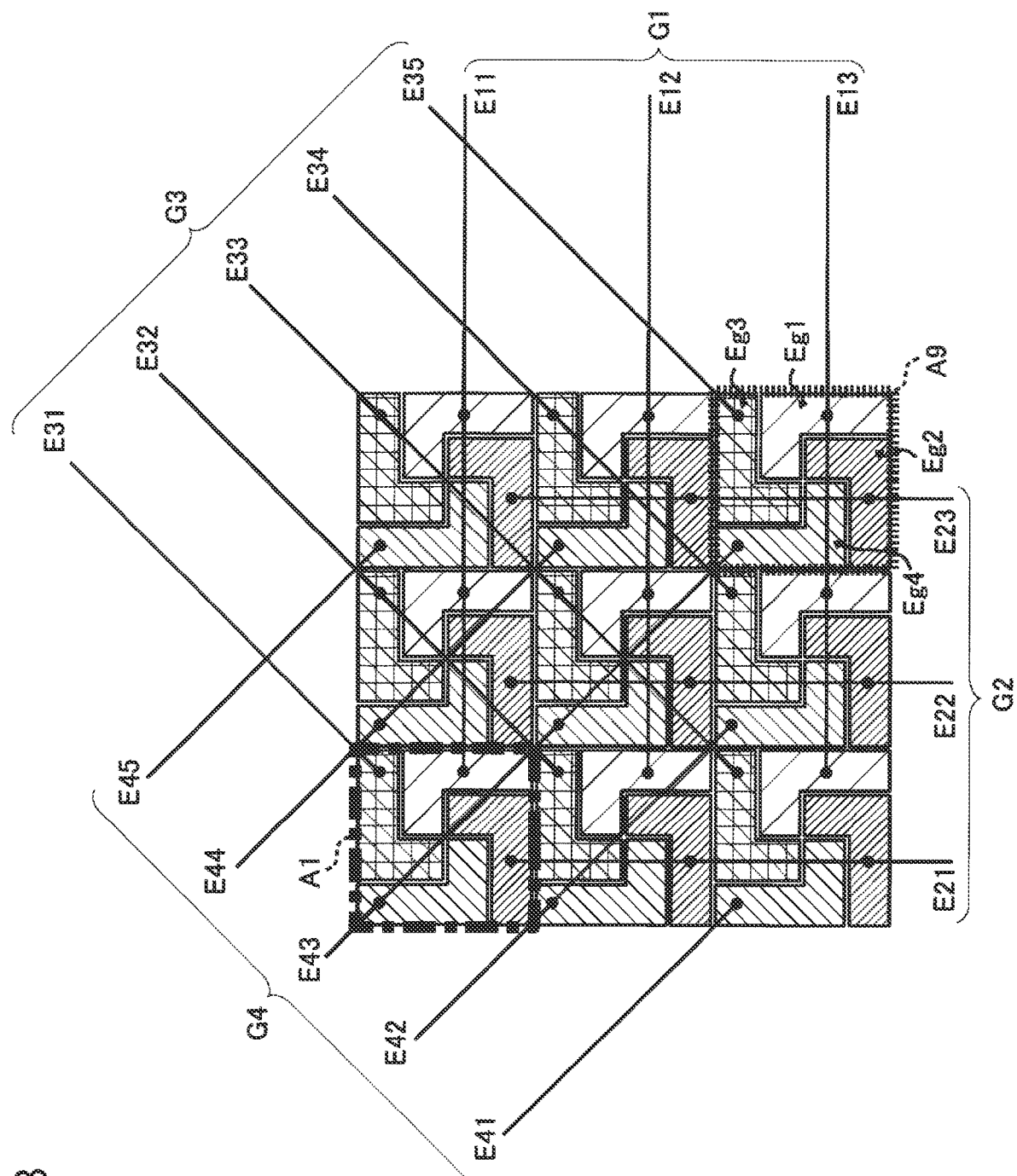
FIG. 12B is a diagram illustrating an example of electrodes arranged in the detection area.

FIGS. 12A and 12B are diagrams illustrating a modification of the arrangement pattern of the electrodes E in the capacitance sensor according to the embodiment, and the number of electrode groups G is four. FIG. 12A is a diagram illustrating an example of nine sections (A1 to A9) that divide the detection area AR, and FIG. 12B is a diagram illustrating an example of 16 electrodes (E11 to E13, E21 to E23, E31 to E35, and E41 to E45) arranged in the detection area AR.

In the example of FIG. 12A, the detection area AR is equally divided into the nine sections A. The nine sections A are individually congruent rectangles, and are arranged in a matrix of 3 rows by 3 columns.

In the example of FIG. 12B, 16 electrodes E are divided into four electrode groups G1 to G4 extending differently. The electrode group G1 includes three electrodes E11 to E13, the electrode group G2 includes three electrodes E21 to E23, the electrode group G3 includes five electrodes E31 to E35, and the electrode group G4 includes five electrodes E41 to E45. The electrodes E11 to E13 belonging to the electrode group G1 extend in the row direction across three sections A and are arranged in different rows. The electrodes E21 to E23 belonging to the electrode group G2 extend in the column direction across three sections A and are arranged in different columns. The electrodes E31 to E35 belonging to the electrode group G3 extend in a diagonal direction (a direction from a third column in a first row to a first column in a third row) that is different from the row direction or the column direction. The electrodes E41 to E45 belonging to the electrode group G4 extend in the other diagonal direction different from the electrode group G3 (a direction from a first column in a first row to a third column in a third row). The 16 electrodes (E11 to E13, E21 to E23, E31 to E35, and E41 to E45) are arranged so that gaps between the electrodes are as small as possible while a state of being insulated from each other is maintained.

Each of the plurality of sections A includes four partial electrodes Eg1 to Eg4 that individually form portions of the different electrodes E. The four partial electrodes Eg1 to Eg4 included in the same section A belong respectively to the different electrode groups G. Specifically, the partial electrode Eg1 belongs to the electrode group G1, the partial electrode Eg2 belongs to the electrode group G2, the partial electrode Eg3 belongs to the electrode group G3, and the partial electrode Eg4 belongs to the electrode group G4. In the example of FIG. 12B, shapes of the four partial electrodes Eg1 to Eg4 are congruent L shapes and point symmetric relative to a center of the section A.

In the example of FIG. 12B, each of the three electrodes E11 to E13 belonging to the electrode group G1 includes three partial electrodes Eg1, and the three partial electrodes Eg1 constituting the same electrode E are arranged in the row direction.

Furthermore, each of the three electrodes E21 to E23 belonging to the electrode group G2 includes three partial electrodes Eg2, and the three partial electrodes Eg2 constituting the same electrode E are arranged in the column direction.

The electrode E33 belonging to the electrode group G3 includes three partial electrodes Eg3. Each of the electrodes E32 and E34 belonging to the electrode group G3 includes two partial electrodes Eg3. Each of the electrodes E31 and E35 belonging to the electrode group G3 includes one partial electrode Eg3. A plurality of partial electrodes Eg3 included in the same electrode E are arranged in the diagonal direction (the direction from the third column in the first row to the first column in the third row).

The electrode E43 belonging to the electrode group G4 includes three partial electrodes Eg4. Each of the electrodes E42 and E44 belonging to the electrode group G4 includes two partial electrodes Eg4. Each of the electrodes E41 and E45 belonging to the electrode group G4 includes one partial electrode Eg4. A plurality of partial electrodes Eg4 included in the same electrode E are arranged in the other diagonal direction (the direction from the first column in the first row to the third column in the third row).

Note that wiring for connecting a plurality of partial electrodes Eg included in the same electrode E is formed on a back surface opposite to a front surface of a substrate on which the electrodes E are formed or a wiring layer inside the substrate.

In the example of FIG. 12B, areas of the partial electrodes Eg1 to Eg4 in the section A are equal to one another, and therefore, sensitivity ratios RS1 to RS4 of the electrode groups G1 to G4 in the section A are equal to one another. Specifically, values of the sensitivity ratios RS1 to RS4 are all "0.25", and a ratio of the sensitivity ratios RS1 to RS4 is "RS1:RS2:RS3:RS4=1:1:1:1". When a detection result of the capacitance detection unit 12 is not affected by noise, a ratio of the sum totals U1 to U4 calculated by the detection value obtaining unit 22 for the electrode groups G1 to G4 is substantially represented by "U1:U2:U3:U4=1:1:1:1". Accordingly, the determination unit 24 determines whether the ratio of the sum totals U1 to U4 is included in a predetermined normal range based on "U1:U2:U3:U4=1:1:1:1" in the determination about the noise influence.

Figure 13:
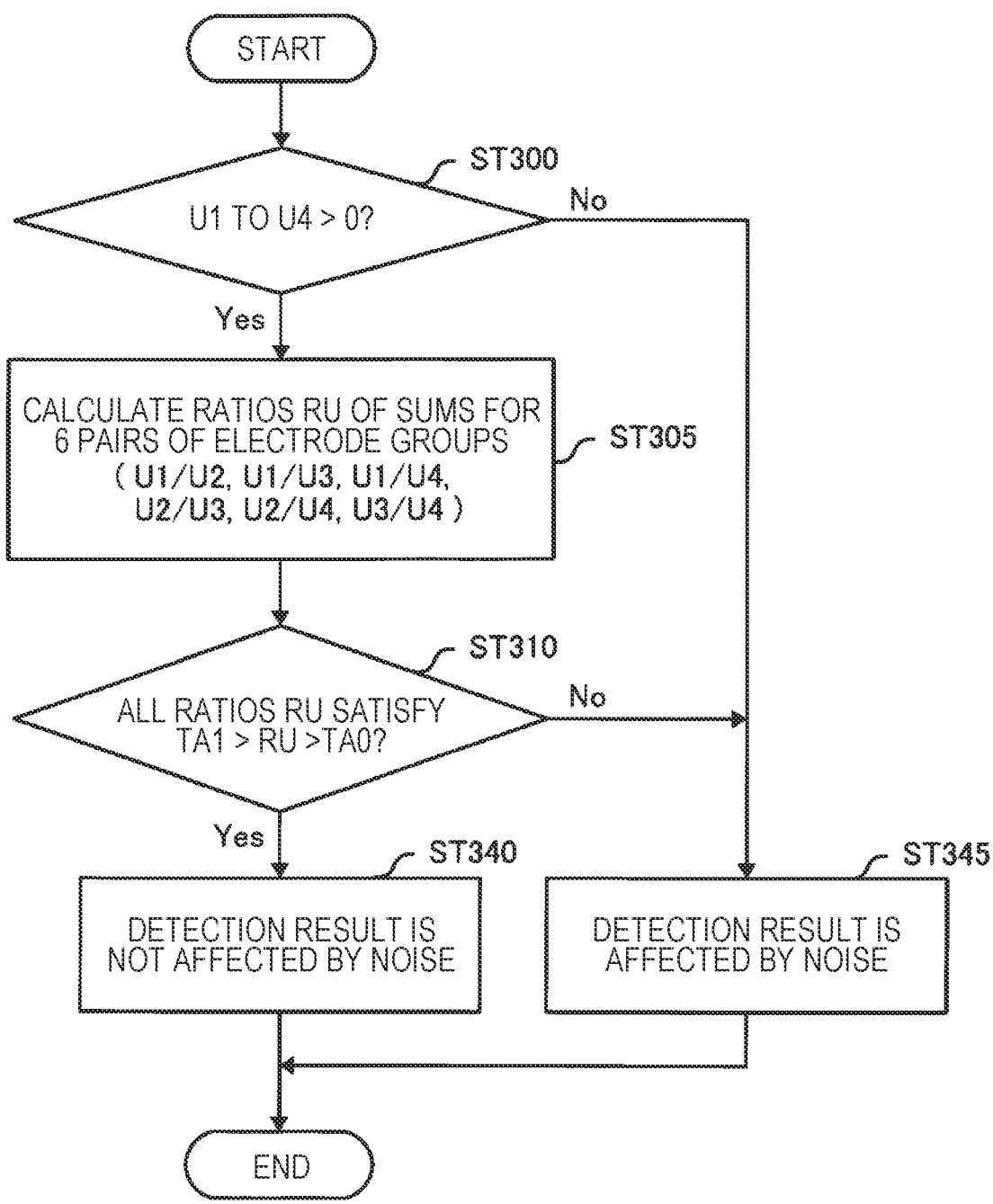
FIG. 13 is a flowchart for explaining a modification of the operation of determining presence or absence of influence of noise.

FIG. 13 is a flowchart for explaining a first modification of the operation of determining presence or absence of influence of noise performed by the determination unit 24 (step ST115 in FIG. 4). In this operation example, the number of electrode groups G is four (FIG. 12B).

In the first modification, first, the determination unit 24 determines whether all the four sum totals U1 to U4 calculated for the four electrode groups G1 to G4 are individually larger than zero (ST300). A case where at least one of the four sum totals U1 to U4 is zero or less (No in ST300) will now be described. In this case, the determination unit 24 determines that a detection result of the capacitance detection unit 12 is affected by noise (ST345).

When all the four sum totals U1 to U4 are larger than zero (Yes in ST300), the determination unit 24 calculates ratios RU of twos of the sum totals U of all pairs of the four electrode groups G (six pairs) (ST305). For example, the determination unit 24 obtains "U1/U2", "U1/U3", "U1/U4", "U2/U3", "U2/U4", and "U3/U4" as the ratios RU. When the detection result is not affected by noise, a ratio of the sum totals U1 to U4 is substantially represented by "U1:U2:U3:U4=1:1:1:1", and therefore, the six ratios RU are all approximately "1".

The determination unit 24 determines, for each of the six ratios RU, whether the ratio RU calculated for a pair of electrode groups G is included in a predetermined normal range set for the pair (ST310). Since the six ratios RU are approximately "1" when the detection result is not affected by noise, normal ranges set for the six ratios RU are equal to one another (a range larger than a threshold value TA0 and smaller than a threshold value TA1). When all the six ratios RU are included in the normal range (Yes in ST310), the determination unit 24 determines that the detection result of the capacitance detection unit 12 is not affected by noise (ST340). On the other hand, when at least one of the ratios RU is out of the normal range (No in ST310), the determination unit 24 determines that the detection result of the capacitance detection unit 12 is affected by noise (ST345).

According to the first modification illustrated in the flowchart of FIG. 13, the ratios RU of twos of the sum totals U of all the pairs of the electrode groups G are calculated, and it is determined whether at least one of the ratios RU calculated for at least one pair is included in the normal range. The normal range in this determination is set for each pair based on a ratio of two sensitivity ratios corresponding to the two electrode groups G constituting the pair. When at least one of the ratios RU is out of the normal range, the ratio of the four sum totals U (U1:U2:U3:U4) does not satisfy the determination criterion of the normal state set based on the ratio of the four sensitivity ratios corresponding to the four electrode groups G, and therefore, the determination unit 24 determines that the detection result of the capacitance detection unit 12 is affected by noise.

Figure 14:
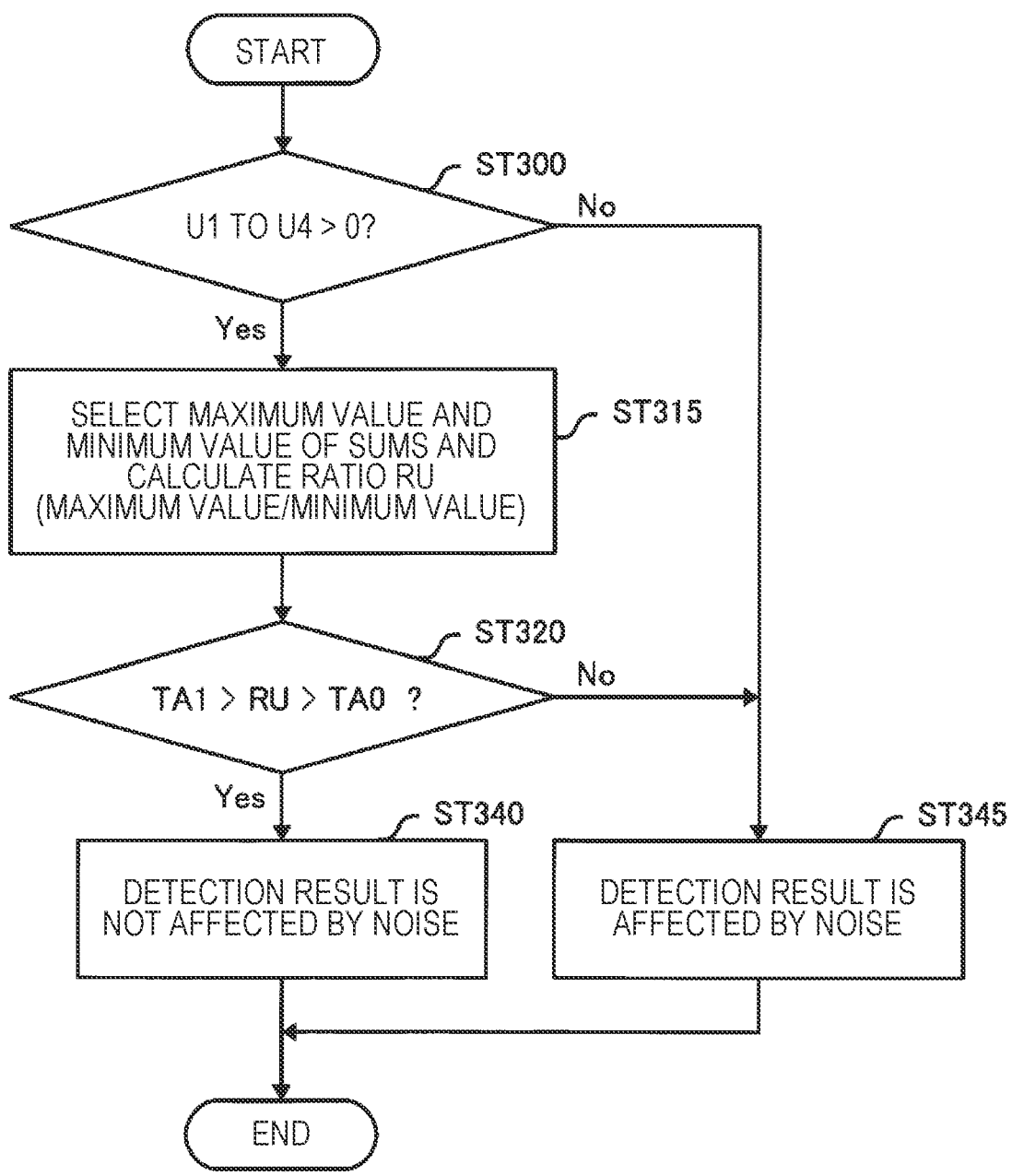
FIG. 14 is a flowchart for explaining a modification of the operation of determining presence or absence of influence of noise.

FIG. 14 is a flowchart for explaining a second modification of the operation of determining presence or absence of influence of noise performed by the determination unit 24 (step ST115 in FIG. 4). As with FIG. 13, in this operation example, the number of electrode groups G is four (FIG. 12B).

In the second modification, first, the determination unit 24 determines whether all the four sum totals U1 to U4 calculated for the four electrode groups G1 to G4 are individually larger than zero (ST300). When at least one of the four sum totals U1 to U4 is zero or less (No of ST300), the determination unit 24 determines that a detection result of the capacitance detection unit 12 is affected by noise (ST345).

When all the four sum totals U1 to U4 are larger than zero (Yes in ST300), the determination unit 24 calculates a ratio RU (maximum value/minimum value) of a maximum value and a minimum value of the four sum totals U calculated for the four electrode groups G (ST315). The ratio RU (maximum value/minimum value) of the maximum value and the minimum value is a largest value among ratios RU of twos of the sum totals U calculated for all the pairs of electrode groups G (six pairs). When influence of noise is absent, the ratio RU is approximately "1". When the ratio RU of the maximum value and the minimum value is close to "1", ratios RU of twos of the sum totals U of the other pairs of electrode groups G are closer to "1" relative to the ratio RU of the maximum value and the minimum value.

The determination unit 24 determines whether the ratio RU of the maximum value and the minimum value is included in the predetermined normal range (ST320). When the ratio RU of the maximum value and the minimum value is included in the normal range (Yes in ST320), the determination unit 24 determines that the detection result of the capacitance detection unit 12 is not affected by noise (ST340). On the other hand, when the ratio RU of the maximum value and the minimum value is out of the normal range (No in ST320), the determination unit 24 determines that the detection result of the capacitance detection unit 12 is affected by noise (ST345).

According to the second modification illustrated in the flowchart of FIG. 14, since the four sensitivity ratios corresponding to the four electrode groups G are the same (0.25), two of the electrode groups G that are arbitrarily selected have the same sensitivity ratio, and a ratio thereof is 1. In the normal state in which a detection result of the capacitance detection unit 12 is not affected by noise, a ratio RU of two sum totals calculated for the two arbitrarily-selected electrode groups G is approximately close to 1. When the ratio RU of the minimum value and the maximum value in the four sum totals is out of the predetermined normal range close to 1, a ratio of two sum totals U of at least one of pairs of electrode groups G is out of the normal range, and therefore, it is determined that a detection result of the capacitance detection unit 12 is affected by noise. On the other hand, when the ratio RU of the minimum value and the maximum value is included in the predetermined normal range, ratios of twos sum totals U of all the pairs of electrode groups G are included in the normal range, and therefore, it is determined that a detection result of the capacitance detection unit 12 is not affected by noise.

Figure 15:
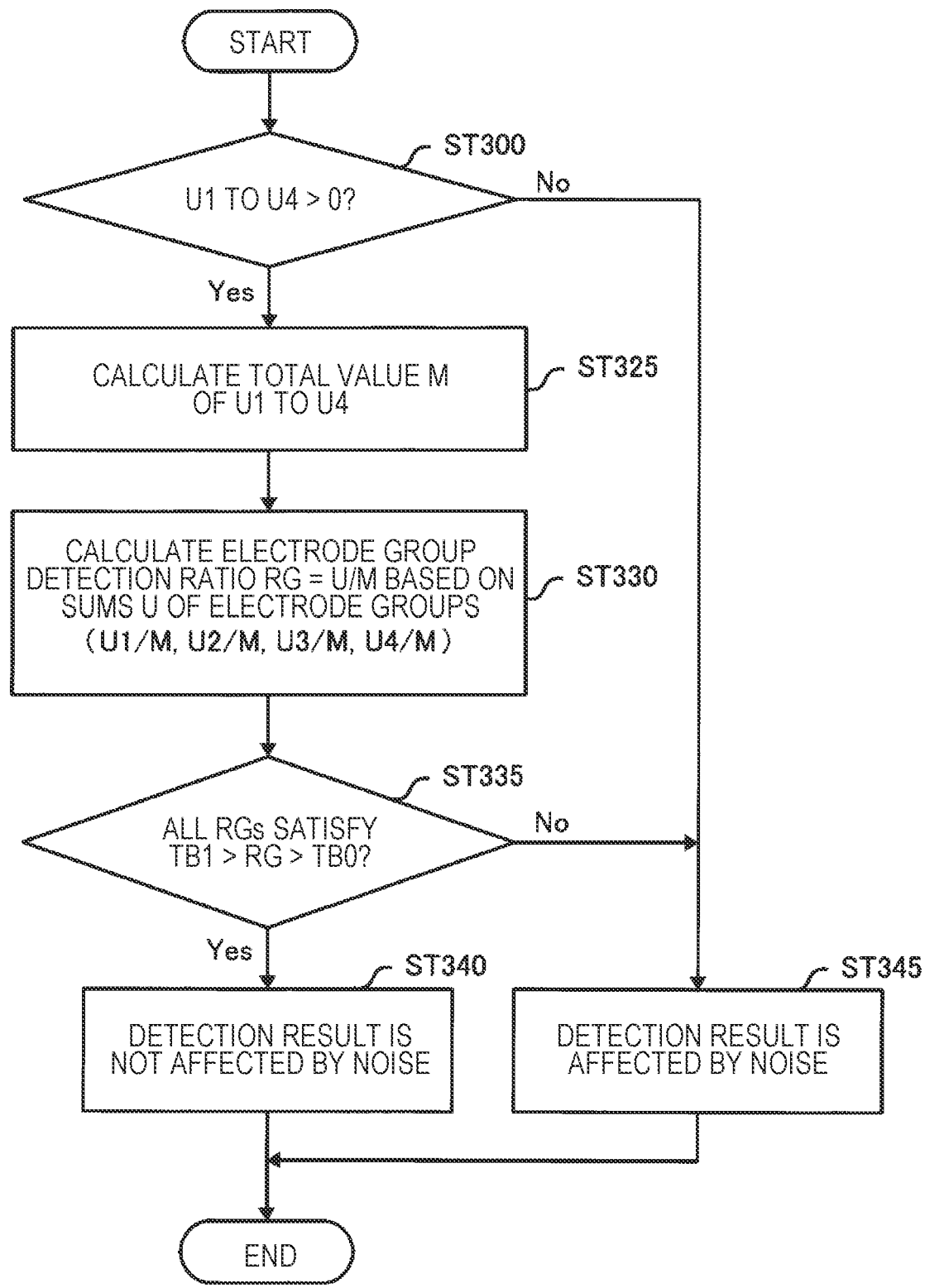
FIG. 15 is a flowchart for explaining a modification of the operation of determining presence or absence of influence of noise.

FIG. 15 is a flowchart for explaining a third modification of the operation of determining presence or absence of influence of noise performed by the determination unit 24 (step ST115 in FIG. 4). As with FIGS. 13 and 14, in this operation example, the number of electrode groups G is four (FIG. 12B).

In the third modification, first, the determination unit 24 determines whether all the four sum totals U1 to U4 calculated for the four electrode groups G1 to G4 are individually larger than zero (ST300). When at least one of the four sum totals U1 to U4 is zero or less (No of ST300), the determination unit 24 determines that a detection result of the capacitance detection unit 12 is affected by noise (ST345).

When all the four sum totals U1 to U4 are larger than zero (Yes in ST300), the determination unit 24 calculates a total value M (=U1+U2+U3+U4) of the four sum totals U calculated for the four electrode groups G (ST325).

Subsequently, the determination unit 24 calculates an electrode group detection ratio RG (=U/M) that is ratios of a total value M to a sum total U calculated for an electrode group G for each of the four electrode groups G. Specifically, the determination unit 24 calculates "U1/M", "U2/M", "U3/M", and "U4/M" as electrode group detection ratios RG. The sum total U calculated for one electrode group G corresponds to capacitance of a capacitor formed between the object 1 and the electrode group G in the entire detection area AR, and the total value M corresponds to capacitance of a capacitor formed between the object 1 and N electrode groups G in the entire area AR. Therefore, the electrode group detection ratio RG (=U/M) corresponds to a sensitivity ratio of the electrode group G in the entire detection area AR and is substantially the same as a sensitivity ratio of the electrode group G in a section A. Assuming that a size of the object 1 is sufficiently larger than a size of the section A, all electrode group detection ratios RG of the electrode groups G obtained when a detection result is affected by noise are close to "0.25".

The determination unit 24 determines, for each of the four electrode group detection ratios RG, whether the electrode group detection ratio RG calculated for one electrode group G is included in the predetermined normal range set for the sensitivity ratio of the electrode group G (ST335). Since the four electrode group detection ratios RG are values close to "0.25" when a detection result is not affected by noise, normal ranges set for the four electrode group detection ratios RG are equal to one another (a range larger than a threshold value TB0 and smaller than a threshold value TB1). When all the four electrode group detection ratios RG are included in the normal range (Yes in ST335), the determination unit 24 determines that a detection result of the capacitance detection unit 12 is not affected by noise (ST340). On the other hand, when at least one of the electrode group detection ratios RG is out of the normal range (No in ST335), the determination unit 24 determines that the detection result of the capacitance detection unit 12 is affected by noise (ST345).

According to the third modification illustrated in the flowchart of FIG. 15, the electrode group detection ratios RG of the four electrode groups G are calculated, and it is determined whether each of the four calculated electrode group detection ratios RG is included in the normal range. It is determined whether the electrode group detection ratio RG calculated for one of the electrode groups G is included in the normal range set based on the sensitivity ratio of the electrode group G. The electrode group detection ratio RG is a ratio of a sum total U calculated for one electrode group G and a total value M of N sum totals U calculated for four electrode groups, and is a value corresponding to a sensitivity ratio of the electrode group G. Therefore, in the normal state in which a detection result of the capacitance detection unit 12 is not affected by noise, an electrode group detection ratio RG is substantially the predetermined value (0.25) corresponding to the sensitivity ratio and is included in the normal range. When at least one of the electrode group detection ratios RG is out of the normal range, the at least one of the electrode group detection ratios RG is shifted from the value (0.25) corresponding to the sensitivity ratio, and therefore, it is determined that the detection result of the capacitance detection unit 12 is affected by noise.

Figure 16A:
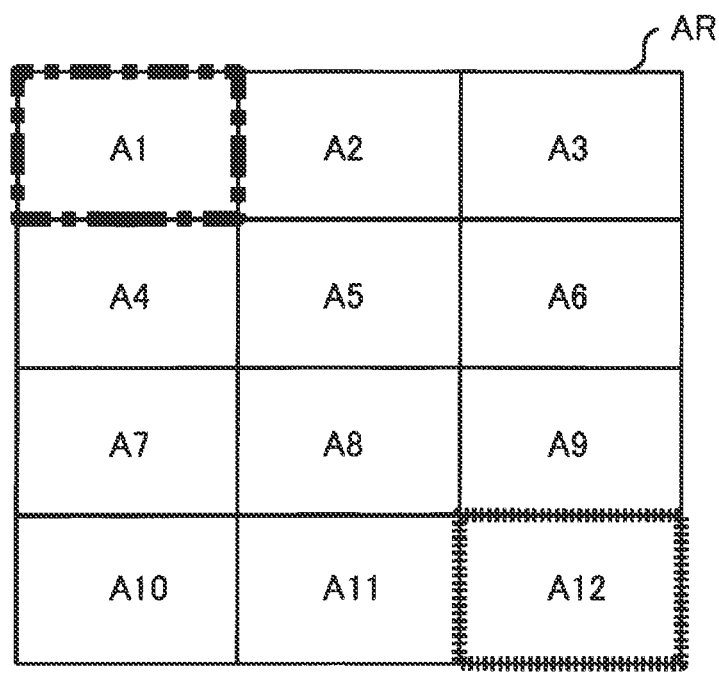
FIG. 16A is a diagram illustrating an example of a plurality of sections dividing a detection area.
Figure 16B:
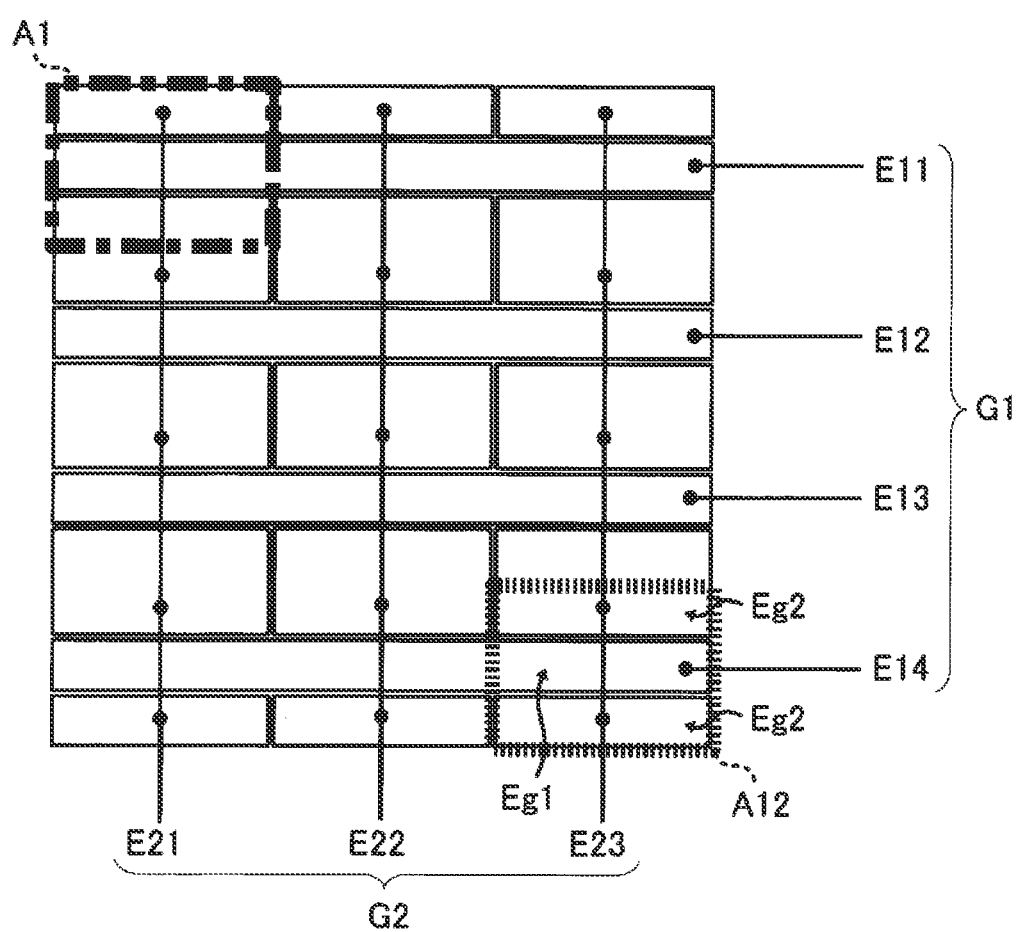
FIG. 16B is a diagram illustrating an example of electrodes arranged in a detection area.

FIGS. 16A and 16B are diagrams illustrating a modification of the arrangement pattern of the electrodes E in the capacitance sensor according to this embodiment, and two different electrode groups G have different sensitivity ratios. FIG. 16A is a diagram illustrating an example of 12 sections A1 to A12 that divide the detection area AR, and FIG. 16B is a diagram illustrating an example of seven electrodes (E11 to E14 and E21 to E23) arranged in the detection area AR.

The division of the detection area AR in the example of FIG. 16A is the same as the example of FIG. 3A described above. Furthermore, a configuration of the two electrode groups G1 and G2 in the example of FIG. 16B is the same as the example of FIG. 3B described above, and a configuration of the electrodes E11 to E14 included in the electrode group G1 and a configuration of the electrodes E21 to E23 included in the electrode group G2 are also the same as the examples of FIG. 3B described above.

In the example of FIG. 16B, ratios of an area of a partial electrode Eg1 to an area of a partial electrode Eg2 in each section A are different from those of the example in FIG. 3B. Specifically, although the area of the partial electrode Eg1 and the area of the partial electrode Eg2 are substantially the same in the example of FIG. 3B, the area of the partial electrode Eg2 is twice as large as the area of the partial electrode Eg1 in the example of FIG. 16B.

Furthermore, in the example of FIG. 16B, the partial electrode Eg1 is a rectangle extending in a row direction and the partial electrode Eg2 includes two rectangles extending in the row direction. The partial electrode Eg1 is sandwiched between the two portions (the rectangles) of the partial electrode Eg2 from opposite sides in a column direction. The two rectangle portions included in the partial electrode Eg2 are coupled with each other through a bypass line formed on a back surface of a substrate or a wiring layer inside the substrate. Furthermore, four partial electrodes Eg2 included in one of the electrodes E (E21 to E23) belonging to the electrode group G2 are coupled with one another through a bypass line formed on the back surface of the substrate or the wiring layer inside the substrate. Three partial electrodes Eg1 included in one of the electrodes E (E11 to E14) belonging to the electrode group G1 are directly coupled with one another without a bypass line and form a rectangle electrode pattern extending in the row direction.

In the example of FIG. 16B, since the area of the partial electrode Eg2 in one section A is twice as large as the area of the partial electrode Eg1, a sensitivity ratio RS2 of the electrode group G2 in the section A is twice as large as a sensitivity ratio RS1 of the electrode group G1. Specifically, a ratio of the sensitivity ratios RS1 and RS2 is represented by "RS1:RS2=1:2". When a detection result of the capacitance detection unit 12 is not affected by noise, a ratio of sum totals U1 and U2 calculated by the detection value obtaining unit 22 for the electrode groups G1 and G2 is substantially represented by "U1:U2=1:2". Accordingly, the determination unit 24 determines whether the ratio of the sum totals U1 and U2 is included in a predetermined normal range based on "U1:U2=1:1" in the determination about the noise influence. For example, in step ST210 in the flowchart of FIG. 5, the determination unit 24 determines whether a ratio RU of the sum totals U1 and U2 (=U1/U2) is included in the normal range that is close to "0.5".

Although the capacitance sensor according to this embodiment has been described hereinabove, the present disclosure is not limited to the foregoing embodiment and includes variations.

For example, the number of electrode groups G arranged in the detection area AR, the number of electrodes E included in each electrode group G, a shape of partial electrodes Eg included in an electrode E, a ratio of areas of partial electrodes Eg inside a section A are merely examples in the foregoing description, and the present disclosure is not limited to these examples.

Furthermore, when the determination unit 24 determines that a detection result of the capacitance detection unit 12 is not affected by noise, detection values P may be corrected for each electrode group G so that electrode group detection ratios RG of electrode groups G become close to respective predetermined sensitivity ratios.

What is claimed is:

1. A capacitance sensor for detecting an approach of an object, the capacitance sensor comprising:
    a detection area to which the object approaches, the detection area being divided into a plurality of sections;
    N electrode groups arranged in the detection area, N being a natural number not less than 2, each electrode group including at least one individual electrode;
    a capacitance detection unit configured to detect a capacitance formed between the object and each of the individual electrodes in the N electrode groups, thereby outputting respective detection values for the individual electrodes;
    a sum calculation unit configured to add the detection values of the individual electrodes by the electrode group so as to calculate a sum total of the detection values for each of the N electrode groups, thereby generating N sum totals for the N electrode groups; and
    a determination unit configured to determine whether a detection result of the capacitance detection unit is affected by noise based on the N sum totals,
    wherein a sensitivity ratio of one of the N electrode groups in a given area within the detection area is defined as a ratio of a detection sensitivity of the one of the N electrode groups to a total detection sensitivity of all of the N electrode groups in the given area,
    wherein each of the N electrode groups has a same sensitivity ratio in each of the plurality of predetermined sections across the detection area,
    wherein the determination unit determines whether the detection result of the capacitance detection unit is affected by noise based on ratios among the N sum totals of the N electrode groups and a determination criterion which is set based on ratios among N sensitivity ratios of the N electrode groups.

2. The capacitance sensor according to claim 1,
    wherein each section of the detection area includes N partial electrodes, each of which is part of an individual electrode belonging to corresponding one of the N electrode groups,
    and wherein the sensitivity ratio of one of the N electrode groups in each section corresponds to a ratio of an area occupied by the partial electrode belonging to the corresponding one of the N electrode groups to a total area occupied by all of the partial electrodes of the N partial electrodes in each section.

3. The capacitance sensor according to claim 2,
    wherein the determination unit is further configured to calculate a ratio of two sum totals for every pair of electrode groups selected from among the N electrode groups,
    wherein the determination criterion includes a normal range of sum total ratio which is set for each pair of electrode groups based on a ratio between the two sensitivity ratios of the two electrode groups of the pair,
    and wherein the determination unit is configured to determine whether the ratio of two sum totals calculated for each pair of electrode groups is within the normal range, thereby determining that the detection result of the capacitance detection unit is affected by noise if at least one of the ratios of two sum totals calculated for the N electrode groups is out of the normal range.

4. The capacitance sensor according to claim 2,
    wherein the N sensitivity ratios of the N electrode groups are the same,
    and wherein the determination unit is configured to calculate a ratio between a minimum value and a maximum value of the N sum totals, thereby determining that the detection result of the capacitance detection unit is affected by noise if the ratio between the minimum value and the maximum value is out of a predetermined range which that is approximately 1.

5. The capacitance sensor according to claim 2,
    wherein the determination unit is further configured to calculate, for each of the N electrode groups, an electrode group detection ratio which is a ratio of the sum total calculated for the electrode group to a total value of the N sum totals calculated for the N electrode groups,
    wherein the determination criterion includes a normal range of detection ratio which is set for each electrode group based on the sensitivity ratio of the electrode group,
    and wherein the determination unit is configured to determine whether the electrode group detection ratio of each of the electrode groups is within the normal range of detection ratio, thereby determining that the detection result of the capacitance detection unit is affected by noise if at least one of the electrode group detection ratios calculated for the N electrode groups is out of the normal range.

6. The capacitance sensor according to claim 2,
    wherein the N electrode groups include at least a first electrode group and a second electrode group, and the plurality of sections of the detection area are arranged in a matrix having rows and columns,
    wherein the first electrode group includes a plurality of first partial electrodes such that the first partial electrodes constituting a same individual electrode in the first electrode group are arranged in a row direction of the matrix, and wherein the second electrode group includes a plurality of second partial electrodes such that the second partial electrodes constituting a same individual electrode in the second electrode group are arranged in a column direction of the matrix.

7. The capacitance sensor according to claim 6, wherein the N electrode groups further include at least one third electrode group including a plurality of third partial electrodes such that the third partial electrodes constituting a same individual electrode in the third electrode group are linearly arranged in a direction different from the row direction and the column direction.

8. The capacitance sensor according to claim 1, further comprising:
a coordinate calculation unit configured to determine an approach state of the object in accordance with a determination result of the determination unit and to calculate an approach position.

9. A method for controlling a capacitance sensor that detects an approach of an object, the capacitance censor including: a detection area to which the object approaches, the detection area being divided into a plurality of sections; N electrode groups arranged in the detection area, N being a natural number not less than 2, each electrode group including at least one individual electrode; and a capacitance detection unit that detects a capacitance formed between the object and each of the individual electrodes in the N electrode groups, thereby outputting respective detection values for the individual electrodes, wherein a sensitivity ratio of one of the N electrode groups in a given area within the detection area is defined as a ratio of a detection sensitivity of the one of the N electrode groups to a total detection sensitivity of all of the N electrode groups in the given area, and wherein each of the N electrode groups has a same sensitivity ratio in each of the plurality of sections across the detection area, the control method comprising:
adding the detection values of the capacitance obtained from the individual electrodes by the electrode group so as to calculate a sum total of the detection values for each of the N electrode groups, thereby generating N sum totals for the N electrode groups; and determining whether a detection result of the capacitance detection unit is affected by noise based on rations among the N sum totals of the N electrode groups and a determination criterion which is set based on rations among N sensitivity ratios of the N electrode groups.

10. A program storage device readable by machine, which causes a computer to execute the method for controlling a capacitance sensor according to claim 9.

* * * * *